US011518773B2

(12) United States Patent
Auner et al.

(10) Patent No.: US 11,518,773 B2
(45) Date of Patent: *Dec. 6, 2022

(54) INTEGRATED PROCESS FOR THE MANUFACTURE OF METHYLCHLOROHYDRIDOMONOSILANES

(71) Applicant: MOMENTIVE PERFORMANCE MATERIALS INC., Waterford, NY (US)

(72) Inventors: Norbert Auner, Glashütten (DE); Tobias Santowski, Langenselbold (DE); Alexander Sturm, Mainz (DE); Thorsten Felder, Düsseldorf (DE); Kenrick Lewis, Flushing, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/647,573

(22) PCT Filed: Sep. 20, 2018

(86) PCT No.: PCT/US2018/051861
§ 371 (c)(1),
(2) Date: Mar. 16, 2020

(87) PCT Pub. No.: WO2019/060487
PCT Pub. Date: Mar. 28, 2019

(65) Prior Publication Data
US 2020/0262851 A1 Aug. 20, 2020

Related U.S. Application Data

(60) Provisional application No. 62/560,855, filed on Sep. 20, 2017.

(30) Foreign Application Priority Data

Jun. 15, 2018 (EP) .................................... 18177918

(51) Int. Cl.
*C07F 7/14* (2006.01)

(52) U.S. Cl.
CPC ...................................... *C07F 7/14* (2013.01)

(58) Field of Classification Search
CPC ........................................................ C07F 7/14
See application file for complete search history.

(56) References Cited

U.S. PATENT DOCUMENTS

| | | | | |
|---|---|---|---|---|
| 1,501,756 A * | 7/1924 | Cloyd | ...................... | C25C 3/02 205/408 |
| 2,458,703 A * | 1/1949 | Hatcher | ................. | C01B 33/107 423/342 |
| 3,099,671 A * | 7/1963 | George | .................. | C07F 7/0827 556/467 |
| 3,496,206 A * | 2/1970 | Berger | ................... | C07F 7/0896 556/432 |
| 3,535,092 A * | 10/1970 | Chalk | .................. | C01B 33/1071 556/451 |
| 3,627,803 A | 12/1971 | Michael | | |
| 3,872,220 A * | 3/1975 | Smith, Jr. | ............... | C01D 15/04 423/499.3 |
| 4,007,257 A * | 2/1977 | Lemieux | ............... | C01B 3/0015 423/646 |
| 4,041,136 A * | 8/1977 | Franklin | ................... | C01B 6/04 423/347 |
| 4,139,428 A * | 2/1979 | Dean | ........................ | C25C 3/02 205/373 |
| 4,274,834 A * | 6/1981 | Brown | ................... | C01D 15/04 23/302 R |
| 4,291,167 A * | 9/1981 | Allain | .................... | C07F 7/0896 556/430 |
| 4,295,986 A * | 10/1981 | Gordon | .................. | B01J 31/146 252/188.26 |
| 4,396,589 A * | 8/1983 | Bogdanovic | ......... | B01J 31/1805 423/409 |
| 4,405,591 A * | 9/1983 | Grosbois | ............... | C01B 33/043 423/347 |
| 4,605,547 A * | 8/1986 | Dumousseau | ............ | C01B 6/04 423/646 |
| 4,629,801 A * | 12/1986 | Soula | ..................... | C07F 7/0896 556/466 |
| 4,667,048 A * | 5/1987 | Inoue | ...................... | C07F 7/125 556/469 |
| 4,816,541 A * | 3/1989 | Koerner | ................. | C08G 77/38 556/451 |
| 4,824,657 A | 4/1989 | Jadhav | | |

(Continued)

FOREIGN PATENT DOCUMENTS

| | | | | |
|---|---|---|---|---|
| CN | 104892659 A | | 9/2015 | |
| CN | 108129510 A | * | 6/2018 | ............ C07F 7/0896 |
| CN | 108530477 A | * | 9/2018 | .............. C07F 7/126 |
| EP | 0301678 A2 | | 4/1988 | |

(Continued)

OTHER PUBLICATIONS

A. Gilbert et al., 51 Industrial & Engineering Chemistry, 665-668 (1959) (Year: 1959).*
T. Santowski et al., 25 Chemistry a European Journal, 13202-13207 (2019) (Year: 2019).*
Kirk-Othmer Encyclopedia of Chemical Technology, "Silicon Compounds Silanes", 1-29 (2000) (Year: 2000).*
CAS Abstract, Y. Toyoda et al., JP 03024901 (1991) (Year: 1991).*
Y. Hoh et al., Production and Electrolysis of Light Metals. Pergamon, 223-234 (1989) (Year: 1989).*

(Continued)

*Primary Examiner* — Alexander R Pagano

(74) *Attorney, Agent, or Firm* — James C. Abruzzo

(57) ABSTRACT

The present invention relates to an integrated process for the manufacture of methylchlorohydridomonosilanes in particular, from products of the Müller-Rochow Direct Process.

13 Claims, No Drawings

(56) References Cited

U.S. PATENT DOCUMENTS

| | | | |
|---|---|---|---|
| 4,958,040 A * | 9/1990 | Yoshioka | C07F 7/126 556/467 |
| 4,965,388 A | 10/1990 | Halm et al. | |
| 4,966,986 A | 10/1990 | Halm et al. | |
| 4,973,725 A | 11/1990 | Lewis et al. | |
| 4,980,136 A * | 12/1990 | Brown | C01B 35/109 423/179.5 |
| 5,136,070 A | 8/1992 | Bank | |
| 5,300,614 A * | 4/1994 | Michalczyk | C08G 77/60 525/475 |
| 11,008,349 B2 * | 5/2021 | Auner | C07F 7/126 |
| 2013/0172593 A1 | 7/2013 | Lewis et al. | |
| 2020/0223874 A1 * | 7/2020 | Auner | C07F 7/12 |
| 2020/0283457 A1 * | 9/2020 | Auner | C07F 7/121 |

FOREIGN PATENT DOCUMENTS

| | | | |
|---|---|---|---|
| EP | 0380837 A1 | | 8/1990 |
| EP | 0878476 A1 | | 11/1998 |
| GB | 851013 | * | 10/1960 |
| GB | 851013 A | | 10/1960 |
| JP | 52151130 A | * | 12/1977 |
| JP | 63048289 A | * | 2/1988 |
| JP | 0324091 A | | 2/1991 |
| JP | H0324091 A | * | 2/1991 |
| RU | 2436788 C1 | | 12/2011 |

OTHER PUBLICATIONS

T. Eggman, "Hydrides", Kirk-Othmer Encyclopedia of Chemical Technology, 607-631 (2004) (Year: 2004).*
R. Howie et al., 86 Physical Review (2012) (Year: 2012).*
C. Kamienski et al., "Lithium and Lithium Compounds", Kirk-Othmer Encyclopedia of Chemical Technology, 1-40 (2004) (Year: 2004).*
A. Finholt et al., 69 Journal of the American Chemical Society, 2692-2696 (1947) (Year: 1947).*
M. Missaghi et al., 27 Organometallics, 6364-6366 (2008) (Year: 2008).*
F. Neumeyer et al., Chem. Eur. J., 17165-17168 (2017) (Year: 2017).*
E. Rochow, Journal of the American Chemical Society, 963-965 (1945) (Year: 1945).*
Gilbert et al., "Reduction of Alkylchlorosilanes by Sodium Hydride and Hydrogen-Chlorine Interchange in Chlorosilanes"; Industrial and Engineering Chemistry; 51(5): 1959, 665-668.
Sluchevskaya et al.; "Selective Reduction of Dichlororodimethylsilane to Chlorodimethylsilane"; Journal of General Chemistry USSR, Consultants Bureau, 58(8):m 1988, 1647-1650.
Walsh; "Thermochemistry of silicon-containing compounds. Part 1.—Silicon-halogen compounds, an evaluation"; Journal of the Chemical Society,79(9): 1983 2233-2248.
International Search Report and Written Opinion from PCT/US2018/0518621 dated Mar. 11, 2019.
A.J. Chalk; Journal of Organometallic Chemistry, 21(1): Jan. 1, 1970.
Simon et al., Journal of Organometallic Chemistry, Jan. 1, 1981, pp. 279-286.
Hengge et al., Monatschefe fur chemie, Jan. 1, 1995, pp. 549-555.
Missaghi et al., Organometallics, 27(23): Dec. 8, 2008, pp. 6364-6366.

* cited by examiner

INTEGRATED PROCESS FOR THE MANUFACTURE OF METHYLCHLOROHYDRIDOMONOSILANES

CROSS-REFERENCE TO RELATED APPLICATIONS

The present application is a U.S. National Phase Application of PCT International Application No. PCT/US2018/051861, filed on Sep. 20, 2018, to which priority is claimed from U.S. Patent Application No. 62/560,855 filed Sep. 20, 2017, and EP Patent Application No. 18177918.2 filed Jun. 15, 2018 both of which are incorporated herein by reference in their entireties.

The present invention relates to a new integrated process for the manufacture of methylchlorohydridomonosilanes selected from $Me_2Si(H)Cl$, $MeSi(H)Cl_2$, and $MeSi(H)_2Cl$, in particular, from products of the Müller Rochow Direct Process (MCS or DPR or Direct Synthesis, Rochow Process, or Müller-Rochow Process), in particular, from the entire product stream of the Müller Rochow Direct Process or from partial parts or fractions of the Müller Rochow Direct Process, such as the higher silane fractions or so-called DPR residues. By the process of the present invention methylchlorohydridosilanes, especially key intermediates such as $Me_2Si(H)Cl$ [M2H] or $MeSi(H)Cl_2$ [MH] can be produced more cost-effectively and with lower amounts of undesirable by-products.

Technical Problems

Key-intermediates in the manufacture of functionalized silicones are, in particular, $Me_2Si(H)Cl$ [M2H] or $MeSi(H)Cl_2$ [MH]. Due to their SiH groups they allow the functionalization of silicones such as PDMS base-polymers, formed by hydrolysis and condensation or co-condensation via the chloro substituent, to introduce e.g. organic functional groups. These organic functional groups may be used to adjust the properties of the final silicone product in a wide range. The organic functional groups are introduced by a catalyst-mediated hydrosilylation reaction with unsaturated organic compounds. Therefore, an economic and easy access to such methylchlorohydridosilanes is of utmost importance to achieve a high diversification of the silicone product portfolio.

The MCS direct process (Müller-Rochow Process, MCS=methylchlorosilanes) itself does not deliver commercially sufficient volumes of these enabling and desired SiH containing intermediates. All formed components need to be separated by column distillation in order to isolate the methylchlorohydridosilanes of interest (e.g. M2H and MH). The unwanted components of less value are subsequently re-introduced back into a redistribution process.

In fact, following the given chemistry of the redistribution, the MH ($MeSi(H)Cl_2$) and Mono ($Me_3SiCl$) need to be sacrificed in order to produce the highly valued and more commercially desired intermediate M2H (see: MH+Mono→M2H+Di ($Me_2SiCl_2$). Moreover, by producing an equivalent valuable M2H, also less desirable $Me_2SiCl_2$ [Di] is formed as well. Thus, the economy of the overall process can be assessed to be comparably inefficient, and to date other large volume manufacturing routes are not available for these methylchlorohydridosilanes components.

JP H03 24091 A) describes a process of manufacturing $R_2SiHCl$ by subjecting $R_2SiCl_2$ to partial reduction in a molten salt comprising lithium chloride and potassium chloride, using lithium hydride as a reducing agent. In second embodiment in a first step dialkyldichlorosilanes are produced by the complete reduction of dialkyldichlorosilanes with lithium hydride in the presence of a metal molten salt capable of forming a molten salt with lithium chloride, and then in a separate step the dialkylsilanes thus produced and the dialkyldichlorosilanes used as raw materials are subjected to the redistribution reaction in a separate reactor to form $R_2SiHCl$ in the presence of a catalyst such as Lewis acid catalysts. The process in the reduction step requires high temperatures, and there is no pointer to a process which is carried out in a solvent, leaving alone a process, where reduction and redistribution are carried out simultaneously.

EP 0878476A1 relates to a process for preparing dimethylmonochlorosilane $(CH_3)_2Si(H)Cl$, wherein a reaction mixture comprising dimethyldichlorosilane $(CH_3)_2SiCl_2$, magnesium hydride, and aluminum chloride, is subjected in an inert liquid organic vehicle, to the partial hydrogenation of dimethyldichlorosilane. The presence of $AlCl_3$ causes technical problems because it is difficult to separate from the product formed due to the high solubility in chlorosilanes and the low sublimation temperature. Also the amount of the undesired dimethylsilane is comparatively high.

A. J. CHALK, JOURNAL OF ORGANOMETALLIC CHEMISTRY, vol. 21, no. 1, 1 Jan. 1970 discloses the reduction of a variety of chlorosilanes to the corresponding silicon hydrides with sodium hydride in hexamethylphosphoric triamide (HMPT), tetramethylurea (TMU) and related solvents. There is no description of the manufacture of $Me_2Si(H)Cl$, $MeSi(H)Cl_2$, or $MeSi(H)_2Cl$.

Gerard Simon ET AL, Journal of Organometallic Chemistry, 1 Jan. 1981, pages 279-286, teaches the partial reduction of $MeSiCl_3$ and $Me_2SiCl_2$ using $CaH_2$ or $(TiH_2)_n$ at high temperature (300° C.) which leads to $MeSiHCl_2$ and $Me_2SiHCl$ in low proportion. In the presence of $AlCl_3$ as catalyst the reaction promotes the formation of chlorosilanes $Me_2SiCl_2$ and $Me_3SiCl$, whereby the amount of $MeSiHCl_2$ formed is lowered. Also the presence of $AlCl_3$ causes technical problems because it is difficult to separate from the product formed due to the high solubility in chlorosilanes and the low sublimation temperature.

CN 104 892 659 A discloses a method for synthesizing dialkylmonochlorosilane from dialkyldichlorosilane by reduction with aluminum hydride/aluminum chloride, lithium aluminum hydride/aluminum chloride, sodium hydride/aluminum chloride and aluminum hydride/lithium aluminum hydride in the amido or ureido solvent methyl pyrrolidone, ethyl pyrrolidone, or N,N-dimethyl imidazolidinone. There is no pointer in such document that apart from the hydrogenation reaction a redistribution reaction occurs, and it is also expected that methyl pyrrolidone, ethyl pyrrolidone, or N,N-dimethyl imidazolidinone do not have sufficient nucleophilicity to catalyze the redistribution reaction.

U.S. Pat. No. 5,136,070 relates according to claim 1 to a process for disproportionation of cycloorganosilanes in the presence of a sodium borohydride catalyst. No methylsilanes are used as the starting materials.

EP0301678 relates to the selective and stepwise reduction of polyhalosilanes with alkyltin hydrides. In the reduction of $(CH_3)SiCl_3$ with $(CH_3)_3SnH$ only a trace of $(CH_3)SiCl_2H$ is formed. No redistribution of the chloromethylsilanes takes place. Although redistribution is addressed at some places in EP0301678, it refers solely to a halogen exchange in halogen silanes.

U.S. Pat. No. 3,627,803 relates to the reaction of aluminum alkyls with halo and/or alkoxysilanes at 300° C. or above to give silanes containing SiH groups without alkylation of the silicon. There is redistribution step in such document.

GB851013A relates to a method of reducing a reducible silicon compound, which comprises effecting reaction at a temperature of from 175° to 350° C. between sodium hydride and a silane. There is no indication of a redistribution step.

According to J E Hengge ET AL, Monatshefte für Chemie, 1 Jan. 1995, pages 549-555, trialkyl tin hydrides such as Bu$_3$SnH can be used for the hydrogenation of Si—Cl bonds in mono- and disilanes, wherein, depending on the catalyst required (tertiary amines, N-heterocycles, $\lambda^3$-phosphorus compounds, ammonium and phosphonium salts) only hydrogenated or (with strongly nucleophilic catalysts), also the Si—Si bond can be cleaved. In an example 1,2-dimethyltetrachlorodisilane and tri-n-butyl tin hydride lead to the formation of MeSi(H)Cl$_2$ (20%), MeSi(Cl)H$_2$ (40%) and MeSiH$_3$ (10%) is obtained with a proportion of 70 to 80% of the total amount of silicon used and the reaction solution still contains residues of the starting material as well as hydrogenated di- and oligosilanes. There is no indication of a redistribution reaction in such document, and a relative high excess of the trialkyl tin hydride is necessary. Moreover the amount of MeSiH$_3$ and byproducts is comparatively high, and tin catalysts are not desired from an environmental point of view.

MICHAEL N. MISSAGHI ET AL, ORGANOMETALLICS, vol. 27, no. 23, 8 Dec. 2008 (2008 Dec. 8), pages 6364-6366, disclose the manufacture of organofunctional silicon hydride halides R(CH$_3$)SiHCl. No hydrogenation step is carried out.

RU 2 436 788 C1 discloses the reaction of trimethylchlorosilane with lithium hydride in the presence of tetrakis (diethylamido phosphonium bromide) in toluene at 65-74° C. whereby trimethylsilane is formed. No redistribution is described. US 2013/172593A1 does not disclose a hydrogenation step.

While redistribution reactions have been useful in providing access to alkylhydridohalosilanes, and specifically methyldichlorosilane [MH] and dimethylchlorosilane [M2H], these reactions depend on the limited supply of by-products from the conventional Rochow-Müller Direct Process. The latter is operated to produce dimethyldichlorosilane as the main product. Modifications of the Rochow-Müller Direct Process to increase formation of methyldichlorosilane [MH] and dimethylchlorosilane [M2H] have been disclosed by Lewis, et al. in U.S. Pat. No. 4,973,725 and by Halm, et al., in U.S. Pat. Nos. 4,966,986 and 4,965,388. In all of these disclosures, methyldichlorosilane [MH] is produced in greater quantity than dimethylchlorosilane [M2H]. However, what is needed is a process with higher selectivity to dimethylchlorosilane [M2H]. Particularly desirable is a process in which dimethylchlorosilane [M2H] is produced in excess relative to methyldichlorosilane [M2H]. The instant invention seeks to fulfill this objective by reacting in particular the mixture produced via the conventional Rochow-Müller Direct Process with LiH to convert the dominant constituent dimethyldichlorosilane [Di] to dimethylchlorosilane [M2H]. Thereby, the product composition of the Rochow-Müller Direct Process can be modified to increase selectivity to the methylhydridochlorosilanes, and in particular, to also provide dimethylchlorosilane in excess relative to methyldichlorosilane.

The technical object to be solved here in particular is to find an economically viable and efficient pathway to selectively form methylhydridochlorosilanes in particular from the product or partial parts of the product of the Rochow-Müller Direct Process. The desired product should lead to M2H and MH in high yields and should reduce the formation of undesirable by-products.

Solution of the Technical Problems

These objects have been surprisingly solved by a process for the manufacture of methylchlorohydridomonosilanes, selected from Me$_2$Si(H)Cl, MeSi(H)Cl$_2$, and MeSi(H)$_2$Cl, preferably Me$_2$Si(H)Cl, and MeSi(H)Cl$_2$, and most preferably Me$_2$Si(H)Cl, which comprises: subjecting a silane substrate comprising at least one silane selected from the group consisting of:
(i) Monosilanes,
(ii) Disilanes,
(iii) Oligosilanes,
(iv) Carbodisilanes,
with the proviso that at least one of the silanes (i) to (iv) has at least one chloro substituent,
a) to a hydrogenation reaction with at least one hydride donating source, and
b) to a redistribution reaction, and
c) optionally to a cleavage reaction of the Si—Si bonds of the di- or oligosilanes or the Si—C-bond of the carbodisilanes, and
d) to a separating step of the methylchlorohydridosilanes,
wherein the process is carried out in the presence of one or more solvents, preferably selected from ether solvents, in the absence of AlCl$_3$, wherein
(i) the monosilanes are selected from the general formula (I), $$Me_xSiH_yCl_z \qquad (I)$$

wherein
x=1 to 3,
y=0 to 3,
z=0 to 3, and
x+y+z=4,
(ii) the disilanes are selected from the general empirical formula (II), $$Me_mSi_2H_nCl_o \qquad (II)$$

wherein
m=1 to 6,
n=0 to 5
o=0 to 5 and
m+n+o=6,
(iii) oligosilanes are selected from linear or branched oligosilanes of the general empirical formula (III)

$$Me_pSi_qH_rCl_s \qquad (III),$$

wherein
q=3-7
p=q to (2q+2)
r, s=0 to (q+2)
r+s=(2q+2)−p,
(iv) carbodisilanes are selected from the general formula (IV)

$$(Me_aSiH_bCl_e)-CH_2-(Me_cSiH_dCl_f) \qquad (IV)$$

wherein
a, c are independently of each other 1 to 3,
b, d are independently from each other 0 to 2
e, f are independently from each other 0 to 2,
a+b+e=3,
c+d+f=3.

This integrated process allows in particular to transforming the entire or partial product stream(s) of the Müller Rochow Direct Process directly into the desired methylchlorohydridomonosilanes, in that it combines a hydrogenation reaction with a redistribution reaction and—in particular in the presence of the higher silane fraction(s) of the Müller Rochow Direct Process in the silane substrate—additionally a cleavage reaction. That is, in a preferred embodiment of the invention the entire product streams of the Müller Rochow Direct Process are subjected simultaneously in a one-pot reaction to a hydrogenation reaction, a cleavage reaction and a redistribution reaction by which process the desired methylchlorohydridomonosilanes can be obtained and isolated in high yields. In a further particularly preferred embodiment lithium hydride (LiH) is used as the hydrogenation agent, which can be efficiently regenerated from the lithium chloride (LiCl) formed.

PREFERRED EMBODIMENTS OF THE INVENTION

According to the present invention, the term "redistribution reaction" describes the redistribution of hydrogen, chlorine substituents and/or organyl groups, preferably of hydrogen and chlorine substituents, bound to silicon atoms of one or more silane compounds comprised in the reaction mixture by exchange of these substituents. The exchange can be monitored in particular by $^{29}$Si NMR, by GC and/or GC/MS. The redistribution reactions are preferably catalyzed by the redistribution catalysts described below.

The redistribution reaction of silanes in the context of the present invention includes in particular the comproportionation of two different methylsilanes (one having only chlorine as additional substituents, and one having only hydrogen as additional substituents) with the formation of one specific chlorohydridomethylsilane, such as, in particular:

$$Me_2SiCl_2 + Me_2SiH_2 \rightarrow 2Me_2SiHCl$$

$$2MeSiCl_3 + MeSiH_3 \rightarrow 3MeSiHCl_2$$

opposite to the undesired disproportionation where a chlorohydridomethylsilane reacts to form two different methylsilanes (one having only chlorine as additional substituents, and one having only hydrogen as additional substituents):

$$2Me_2SiHCl \rightarrow Me_2SiCl_2 + Me_2SiH_2$$

$$3MeSiHCl_2 \rightarrow 2MeSiCl_3 + MeSiH_3.$$

In preferred embodiment of the process according to invention, the redistribution reaction of silanes comprises the comproportionation of two different methylsilanes, in particular, of one methylsilane having only chlorine as additional substituents, and one methylsilane having only hydrogen as additional substituents, leading to the formation of one specific chlorohydridomethylsilane.

In the present invention the silanes in the silane substrate subjected to the process of the invention comprise at least one of the silanes of the group consisting of
(i) the monosilanes, which are selected from the general formula (I), $$Me_xSiH_yCl_z \quad (I),$$

wherein
x=1 to 3,
y=0 to 3,
z=0 to 3, and
x+y+z=4, (ii) the disilanes, which are selected from the general empirical formula (II), $$Me_mSi_2H_nCl_o \quad (II)$$

wherein
m=1 to 6,
n=0 to 5
o=0 to 5 and
m+n+o=6, (iii) the oligosilanes, which are selected from linear or branched oligosilanes of the general empirical formula (III)

$$Me_pSi_qH_rCl_s \quad (III),$$

wherein
q=3-7
p=q to (2q+2)
r, s=0 to (q+2)
r+s=(2q+2)−p, and (iv) the carbodisilanes, which are selected from the general empirical formula (IV)

$$(Me_aSiH_bCl_e)-CH_2-(Me_cSiH_dCl_f) \quad (IV)$$

wherein
a, c are independently of each other 1 to 3,
b, d are independently from each other 0 to 2
e, f are independently from each other 0 to 2,
a+b+e=3,
c+d+f=3,
with the proviso that at least one of the silanes of formulas (I) to (IV) has at least one chloro substituent.

In a preferred embodiment the silane substrate is consisting of the silanes of formulas (I) to (IV). More preferably the silane substrate is $Me_2SiCl_2$.

The disilanes of the general empirical formula (II)

$$Me_mSi_2H_nCl_o \quad (II)$$

can be depicted also by the structural formula:

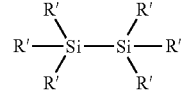

wherein the substituents R' are independently selected from methyl (Me), hydrogen (H) and chlorine (Cl), wherein the number of methyl m=1 to 6, the number of hydrogen atoms n=0 to 5 and the number of chlorine atoms o=0 to 5, and the total of m+n+o=6.

The oligosilanes of the general formula (III)

$$Me_pSi_qH_rCl_s \quad (III),$$

are oligosilanes that have a linear or branched silane skeleton, wherein q=3 to 7 silicon atoms are bonded to each other by single bonds, and the free valencies of the silane skeleton are saturated by substituents selected from methyl (Me), hydrogen (H) and chlorine (Cl) with the proviso that the number of methyl groups p=q to (2q+2), which corresponds to the case where each silicon atom has one methyl group (p=q) and the case of permethylated silanes (p=2q+2) and which means that there are at least 3 methyl groups up to 16 methyl groups (i.e. in $Si_7Me_{16}$) in the silanes; and the number of hydrogen atoms (r) and chlorine atoms (s) are independently of each other 0 to (q+2), and r+s=(2q+2)−p, wherein q is the number of silicone atoms and p is the number of methyl groups, again with the preferred proviso that each Si atom bears at least one methyl group.

In the entire application the meaning of the term "empirical formula" intends to mean that the formulae do not represent the structural formulae, but just sum up the chemical groups or atoms present in the molecule. For example the empirical formula $R_2Si_2Cl_4$ may comprise the structural formulae:

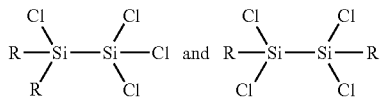

More preferably, in an embodiment, the silane substrate subjected to the process of the present invention comprises at least one of the following silanes:

(i) monosilanes, which are selected from the formulas:
$MeSiCl_3$, $Me_2SiCl_2$, $Me_3SiCl$, $MeSiHCl_2$, $Me_2SiHCl$, $MeSiH_2Cl$, $MeSiH_3$, $Me_2SiH_2$ and $Me_3SiH$, (ii) disilanes, which are selected from the formulas:
$Cl_2MeSi-SiMeCl_2$, $Cl_2MeSi-SiMe_2Cl$, $Cl_2MeSi-SiMe_3$, $ClMe_2Si-SiMe_2Cl$, $Me_3Si-SiMe_2Cl$, $HMe_2Si-SiMe_2Cl$, $H_2MeSi-SiMeClH$, $HClMeSi-SiMeClH$, $ClHMeSi-SiMeCl_2$, $H_2MeSi-SiMeCl_2$, $HMe_2Si-SiMeCl_2$, $ClMe_2Si-SiMeH_2$, $HMe_2Si-SiMeClH$, $ClMe_2Si-SiMeClH$, $Me_3Si-SiMeClH$, $HMe_2Si-SiMe_2H$, $H_2MeSi-SiMeH_2$, $HMe_2Si-SiMeH_2$, $Me_3Si-SiMeH_2$ and $Me_3Si-SiMe_2H$, (iii) oligosilanes, which are selected from the formulas:
$ClMe_2Si-SiMe_2-SiMe_2Cl$, $ClMe_2Si-SiMe_2-SiMe_2-SiMe_2Cl$, $(ClMe_2Si)_3SiMe$, $(Cl_2MeSi)_2SiMeCl$, $(Cl_2MeSi)_3SiMe$, $(Cl_2MeSi)_2SiMe-SiClMe-SiCl_2Me$, $[(Cl_2MeSi)_2SiMe]_2$, $[(Cl_2MeSi)_2SiMe]_2SiClMe$, $(Cl_2MeSi)_2SiMe-SiMe_2Cl$, $ClMe_2Si-SiMe_2SiMe_2H$, $HMe_2Si-SiMe_2-SiMe_2H$, $HMe_2Si-SiMe_2-SiMe_2-SiMe_2H$, $(HMe_2Si)_3SiMe$, $(H_2MeSi)_2SiMeH$, $(H_2MeSi)_3SiMe$, $(H_2MeSi)_2SiMe-SiHMe-SiH_2Me$, $[(H_2MeSi)_2SiMe]_2$, $[(H_2MeSi)_2SiMe]_2SiHMe$ and $(H_2MeSi)_2SiMe-SiMe_2H$, and (iv) carbodisilanes, which are selected from the formulas:
$Cl_2MeSi-CH_2-SiMeCl_2$, $ClMe_2Si-CH_2-SiMeCl_2$, $ClMe_2Si-CH_2-SiMe_2Cl$, $Me_3Si-CH_2-SiMeCl_2$, $Me_3Si-CH_2-SiMe_2Cl$, $HClMeSi-CH_2-SiMeClH$, $HMe_2Si-CH_2-SiMeCl_2$, $HMe_2Si-CH_2-SiMe_2Cl$, $Me_3Si-CH_2-SiMeClH$, $H_2MeSi-CH_2-SiMeH_2$, $HMe_2Si-CH_2-SiMeH_2$, $HMe_2Si-CH_2-SiMe_2H$, $Me_3Si-CH_2-SiMeH_2$, and $Me_3Si-CH_2-SiMe_2H$, with the proviso that at least one of the silanes used in the process has at least one chloro substituent.

More preferably the silane substrate subjected to the process of the present invention comprises at least two, preferably at least three, more preferably at least four silanes at least one of which, preferably all of which having at least one chlorine substituent, preferably selected from the above mentioned silanes.

In a preferred embodiment of the invention the silane substrate comprises at least one silane selected from the group consisting of disilanes (ii), oligosilanes (iii), and carbodisilanes (iv). In a further preferred embodiment of the invention, the silane substrate comprises at least one, preferably more than one silane selected from the group consisting of $MeSiCl_3$, $Me_2SiCl_2$, $Me_3SiCl$, $MeSiHCl_2$, $Me_2SiHCl$, $MeSiH_2Cl$, $MeSiH_3$, $Me_2SiH_2$, $Me_3SiH$, $Cl_2MeSi-SiMeCl_2$, $Cl_2MeSi-SiMe_2Cl$, $Cl_2MeSi-SiMe_3ClMe_2Si-SiMe_2Cl$, $Me_3Si-SiMe_2Cl$, $Cl_2MeSi-$ $CH_2-SiMeCl_2$, $ClMe_2Si-CH_2-SiMeCl_2$, $ClMe_2Si-CH_2-SiMe_2Cl$, $Me_3Si-CH_2-SiMeCl_2$ and $Me_3Si-CH_2-SiMe_2Cl$.

In a further preferred embodiment of the invention the silane substrate comprises one or more products (or product streams) preferably the entire product of the Müller-Rochow Direct Process.

The relevant reactions of the Müller-Rochow Direct Process are ($Me=CH_3$): x $MeCl+Si \rightarrow Me_3SiCl$, $Me_2SiCl_2$, $MeSiCl_3$, and other products.

The major products of the Direct Process are monosilanes such as those of formula (I) above, in particular, dichlorodimethylsilane, $Me_2SiCl_2$, being obtained in about a 70-90 wt-% yield (wt=weight). The next most abundant product is $MeSiCl_3$, at about 3-15 wt-% of the total amount. Other products include $Me_3SiCl$ (about 2-about 4 wt-%), $MeHSiCl_2$ (about 0.9-about 4 wt-%), $Me_2HSiCl$ (about 0.1-about 0.5 wt-%). In an embodiment, these monosilanes are separated by fractional distillation. Up to about 10 wt-%-%, more preferably from about 0.1 to about 10 wt % of the Müller-Rochow Direct Process is formed of higher silanes such as those of the formulas (II) to (IV) which are mostly disilanes.

Accordingly, a preferred silane substrate which is subjected to the process of the present invention comprises for example:
about 2 wt-% to about 10 wt-% higher silanes having more than one silicon atom, such as those of the formulas (II) to (IV) above, and
about 80 wt-% to 96 wt-% monosilanes, such as those of formula (I) above.
each percentage being based on the entire amount of said silanes.

More specifically a preferred silane substrate which is subjected to the process of the present invention comprises for example:
$Me_2SiCl_2$: about 70 wt-%-about 90 wt-%
$MeSiCl_3$: about 3 wt-%-about 15 wt-%,
$Me_3SiCl$: about 2 wt-%-about 4 wt-%,
$MeHSiCl_2$: about 0.9 wt-%-about 4 wt-%,
$Me_2HSiCl$ about 0.1 wt-%-about 0.5 wt-%, and
higher silanes, having more than such as those of the formulas (II) to (IV): about 4 wt-% to about 10 wt-%,
each percentage being based on the entire amount of said silanes. The silane substrate may comprise other silanes not specifically mentioned here in a total amount of e.g. up to 3 parts based on 100 parts of the above composition, i.e. a composition of
$Me_2SiCl_2$: about 70 wt-%-about 90 wt-%
$MeSiCl_3$: about 3 wt-%-about 15 wt-%,
$Me_3SiCl$: about 2 wt-%-about 4 wt-%,
$MeHSiCl_2$: about 0.9 wt-%-about 4 wt-%,
$Me_2HSiCl$ about 0.1 wt-%-about 0.5 wt-%, and
higher silanes, having more than such as those of the formulas (II) to (IV): about 4 wt-% to about 10 wt-%.

In a further preferred embodiment of the invention the silane substrate which is subjected to the process of the present invention is the entire product of the Müller-Rochow Direct Process or a part (fraction or product stream) of the product of the Müller-Rochow Direct Process.

The most preferred embodiment of the invention is to subject the entire product of the Müller-Rochow Direct Process to the process of the present invention.

In a further preferred embodiment of the invention the silane substrate which is subjected to the process of the present invention comprises one or more or the entire monosilane fraction of the Müller-Rochow Direct Process product.

It is also possible to subject only a silane substrate which is a part or all of the higher silane fraction (silanes having ≥2 Si atoms) of the Müller-Rochow Direct Process product to the process of the present invention.

It is also possible to subject only a silane substrate, which is the oligosilane fraction (silanes having ≥3 Si atoms) and the carbodisilane fraction of the Müller-Rochow Direct Process product to the process of the present invention.

In a further preferred embodiment of the invention the silane substrate subjected to the process of the present invention is the higher silane fraction (silanes having ≥2 Si atoms) of the Müller-Rochow Direct Process product, from which at least one component has been separated completely or partially, and which component is preferably selected from the group consisting of disilanes having ≥3 chlorine atoms, and disilanes having ≥3 methyl groups.

In a further preferred embodiment of the present invention the silane substrate comprises a product or a fraction of the Müller-Rochow Direct Process product, from which at least one component has been separated completely or partially, which component is selected from the group consisting of $Me_nSiCl_{4-n}$, wherein n=1-3, $Me_2Si(H)Cl$, $MeSi(H)Cl_2$, and $MeSi(H)_2Cl$.

That is, in an embodiment one or more monosilanes, considered of being valuable according to current demands, including in particular the desired methylchlorohydridosilanes ($Me_2Si(H)Cl$, $MeSi(H)Cl_2$, and/or $MeSi(H)_2Cl$) are separated before the remainder of the Müller-Rochow Direct Process product is subjected to the process of the present invention.

In a further preferred embodiment of the present invention it is also possible to carry out at first the hydrogenation reaction a) and thereafter—before the redistribution and the optional cleavage step, the methylchlorohydridosilanes are separated from the reaction mixture.

The process of the present invention is preferably carried out in the presence of one or more solvents, preferably selected from ether solvents.

According to the present invention, the ether solvents can be selected from ether compounds, preferably selected from the group consisting of linear and cyclic aliphatic ether compounds.

In the present invention, the term "ether compound" shall mean any organic compound containing an ether group —O—, in particular of formula $R^1$—O—$R^2$, wherein $R^1$ and $R^2$ are independently selected from an organyl group R.

Preferably, in the present invention R represents an organyl group, which is bound to the silicon atom via a carbon atom, and which organyl group can be the same or different.

Preferably the organyl group is an optionally substituted, more preferably unsubstituted group, which is selected from the groups consisting of: alkyl, aryl, alkenyl, alkynyl, alkaryl, aralkyl, aralkenyl, aralkynyl, cycloalkyl, cycloalkenyl, cycloalkynyl, cycloaralkyl, cycloaralkenyl, and cycloaralkynyl, even more preferably selected from alkyl, cycloalkyl, alkenyl and aryl, even further preferred selected from methyl, vinyl and phenyl, and most preferably R is a methyl group (herein abbreviated as Me).

Preferably, $R^1$ and $R^2$ are substituted or unsubstituted linear or branched alkyl groups or aryl groups, which may have further heteroatoms such as oxygen, nitrogen, or sulfur. In the case of cyclic ether compounds, $R^1$ and $R^2$ can constitute together an optionally substituted alkylene or arylene group, which may have further heteroatoms such as oxygen, nitrogen, or sulfur.

The ether compounds can be symmetrical or asymmetrical with respect to the substituents at the ether group —O—.

In another preferred embodiment of the process of the present invention, the organic solvent in which step A) is conducted is a mixture of one or more ether compounds and one or more non-ether compounds.

Preferably, the one or more non-ether compounds forming the mixture with one or more ether compounds are selected from solvents which are less polar than the ether compounds used, particular preferably from aliphatic or aromatic hydrocarbons.

In a further preferred embodiment of the process according to the invention, the ether compounds used as solvents are selected from the group of linear, cyclic or complexing ether compounds.

Herein, a linear ether compound is a compound containing an ether group $R^1$—O—$R^2$ as defined above, in which there is no connection between the $R^1$ and $R^2$ group except the oxygen atom of the ether group, as for example in the symmetrical ethers $Et_2O$, $n-Bu_2O$, $Ph_2O$ or diisoamyl ether (i-$Pentyl_2O$), in which $R^1=R^2$, or in unsymmetrical ethers as t-BuOMe (methyl t-butyl ether, MTBE) or PhOMe (methyl phenyl ether, anisol).

A cyclic ether compound used as solvent is a compound in which one or more ether groups are included in a ring formed by a series of atoms, such as for instance tetrahydrofurane, tetrahydropyrane or 1,4-dioxane, which can be substituted e.g. by alkyl groups.

In linear ether compounds, also more than one ether group may be included forming a di-, tri-, oligo- or polyether compound, wherein $R^1$ and $R^2$ constitute organyl groups when they are terminal groups of the compounds, and alkylene or arylene groups when they are internal groups. Herein, a terminal group is defined as any group being linked to one oxygen atom which is part of an ether group, while an internal group is defined as any group linked to two oxygen atoms being a constituent of ether groups.

Preferred examples of such compounds are dimethoxy ethane, glycol diethers (glymes), in particular diglyme or tetraglyme, without being limited thereto.

In the sense of present invention, the term "complex ether" is understood as an ether compound as defined above which is capable of complexing cations, preferably metal cations, more preferably alkali and alkaline metal cations, even more preferably alkaline metal cations, and most preferably lithium cations. Preferred examples of such complex ethers according to the invention are glycol diethers (glymes), in particular diglyme, triglyme, tetraglyme or pentaglyme, or crown ethers, in particular 12-crown-4, 15-crown-5, 18-crown-6, dibenzo-18-crown-6, and diaza-18-crown-6 without being limited thereto.

The term "complexing ether" is understood equivalently to the term "complex ether".

In another preferred embodiment of the process according to the invention, the ether compound is used as solvent and is selected from the group consisting of linear ethers, such as diethyl ether, di-n-butyl ether, complexing ethers, such as dimethoxy ethane, diethylene glycol dimethyl ether (diglyme) or tetraethylene glycoldimethyl ether (tetraglyme), alkylated polyethylene glycols (alkylated PEGs), cyclic ethers such as dioxane, preferably 1,4-dioxane, 2-methyltetrahydrofurane, tetrahydrofurane, or tetrahydropyrane.

In a particularly preferred embodiment of the process according to the invention, the ether compound is a high-boiling ether compound, preferably diglyme or tetraglyme.

According to the present invention, the term "high-boiling ether compound" is defined as an ether compound according to above definition with a boiling point at 1.01325 bar (standard atmosphere pressure) of preferably at least about 70° C., more preferably at least about 85° C., even more preferably at least about 100° C., and most preferably at least about 120° C.

High-boiling ethers can facilitate separation of the desired products from the reaction mixture containing the solvent and residual starting materials. The products in general have lower boiling points than the starting materials, and the boiling points of these products are also lower than the boiling point of high-boiling ethers of above definition.

For instance, the respective boiling points (standard atmosphere pressure) of selected representative products are about 35° C. ($Me_2SiHCl$), and about 41° C. ($MeSiHCl_2$), while a representative higher-boiling ether compound diglyme has a boiling point of about 162° C., and the boiling point of unreacted methylchlorodisilanes principally composed of isomers of trimethyltrichlorodisilane and dimethyltetrachlorodisilanes is about 151 to about 158° C.

Application of higher-boiling ether compounds as solvents allows higher reaction temperatures to be utilized and simplifies separation of the desired products from the reaction mixture by distillation.

According to the present invention, the term "hydrogenation reaction a)" refers to the exchange of one or more chlorine substituents at the silicon atoms of the silane substrate by the same number of hydrogen substituents.

According to the present invention, the term hydride donating source refers to any compound which is capable of donating at least one hydride anion in a reaction of the hydride donating source and a substrate according to the invention leading to the conversion of at least one Si—Cl bond to a Si—H bond.

In an embodiment, preferably, the hydrogenation reaction a) of the process according to the invention is performed with a hydride donating source selected from the group of metal hydrides, therein preferably from binary metal hydrides, such as LiH, NaH, KH, $CaH_2$ or $MgH_2$, complex metal hydrides, such as $LiAlH_4$ or $NaBH_4$, and organometallic hydride reagents, such as n-$Bu_3SnH$, i-$Bu_2AlH$ or sodium bis(2-methoxyethoxy) aluminum hydride, or a hydride donating source selected from boron-containing hydride donors, more preferably selected from organohydridoboranes, hydridoboranates, hydridoboronates and hydridoborates, even more preferably hydridoboranates, hydridoboronates and hydridoborates generated from the corresponding boranates, boronates and borates being the Lewis acid part of a frustrated Lewis acid/Lewis base pair and $H_2$.

According to the present invention, the term metal hydride refers to any hydride donating source containing at least one metal atom or metal ion and at least one hydride ion.

Binary metal hydrides according to the present invention are metal hydrides consisting of ions of one specific metal and hydride ions exclusively.

Preferably, the metal hydrides according to the invention are selected from binary metal hydrides, more preferably selected from alkali metal hydrides and alkaline earth metal hydrides, even more preferably selected from the group of lithium hydride, sodium hydride, potassium hydride, magnesium hydride, calcium hydride, even more preferably from lithium hydride and sodium hydride, most preferably the metal hydride is lithium hydride.

The term "complex metal hydrides" according to the invention refers to metal salts wherein the anions contain hydride anions. Typically, complex metal hydrides contain more than one type of metal or metalloid. As there is neither a standard definition of a metalloid nor complete agreement on the elements appropriately classified as such, according to the present invention the term "metalloid" comprises the elements boron, silicon, germanium, arsenic, antimony, tellurium, carbon, aluminum, selenium, polonium, and astatine.

The term "organometallic hydride reagent" refers to compounds that contain bonds between carbon and metal atoms, and which are capable of donating at least one hydride anion in the hydrogenation reaction of hydrogenation step a).

In the preferred embodiment of the invention the hydride donating source used to affect the hydrogenation reaction a) is selected from metal hydrides, most preferably lithium hydride.

In a preferred embodiment of the process according to the invention, the amount of the hydride donating source, in particular of the metal hydride, preferably LiH in the hydrogenation reaction a) in relation to the silane substrate compounds of the general formulae (I), (II), (III) and (IV) is in the range of about 1 mol-% to about 600 mol-%, preferably about 1 to about 400 mol-%, more preferably about 1 to about 200 mol-%, most preferably about 25 to about 150 mol-%, based on the total molar amount of the chlorine atoms present in silane substrate compounds of the general formulae (I), (II), (III) and (IV). For the determination of this ratio, all compounds of the general formulae (I), (II), (III) and (IV) are considered, regardless if they are submitted with other silanes not covered by those formulas.

More preferably, the amount of the hydride donating source, in particular of the metal hydride, preferably LiH, in the hydrogenation reaction a) in relation to the silane substrate compounds of the general formulae (I), (II), (III) and (IV), based on the total molar amount of the chlorine atoms present in silane substrate compounds of the general formulae (I), (II), (III) and (IV) is less than about 100 mol-%, preferably less than about 90 mol-%, more preferably less than about 80 mol-%, in order to leave sufficient chlorine for subsequent redistribution reactions to obtain the desired silanes.

Most preferably the amount of the hydride donating source, in particular of the metal hydride, preferably LiH, in the hydrogenation reaction a) in relation to the silane substrate compounds of the general formulae (I), (II), (III) and (IV), based on the total molar amount of the chlorine atoms present in silane substrate compounds of the general formulae (I), (II), (III) and (IV) is less than about 75 mol-%. Preferably, for the synthesis of monohydrated silanes such as $MeSiHCl_2$ and $Me_2SiHCl$, LiH should be used in stoichiometric deficit (preferably less than about 50 mol-%, preferably less than about 25 mol %), for an increase of the amount of the monosilane $MeSiH_2Cl$ the molar amount is preferably about 25 to about 75 mol %.

In a preferred embodiment of the invention the weight ratio of the hydride donating source, in particular, of the metal hydride, preferably LiH, in the hydrogenation reaction a) in relation to the silane substrates compounds of the general formulae (I), (II), (III) and (IV) is in the range of about 1:100 to about 100:1, preferably 10:90 to about 90:10, more preferably 20:80 to about 80:20.

Herein, the weight ratio is defined as m (hydride donating source, in particular, of the metal hydride, preferably LiH)/m (silane substrate compounds of the general formulae (I) (II), (III) and (IV). For the determination of this ratio, all compounds of the general formulae (I), (II), (III) and (IV) are considered, regardless if they are submitted with other silanes not covered by those formulas.

In another preferred embodiment of the process according to the invention, the weight ratio of the silane substrates to the organic solvent is in the range of about 0.01 to about 100, preferably in the range of about 0.1 to about 10, more preferably about 0.5 to about 4, most preferably about 0.5 to about 1.

Herein, the weight ratio is defined as m (silane substrate compounds of the general formulae (I), (II), (III) and (IV)/m (organic solvents).

For the determination of this ratio, all compounds of the general formulae (I), (II), (III) and (IV) are considered, regardless if they are submitted with other silanes not covered by those formulas.

In a preferred embodiment of the invention an optional cleavage reaction c) of the Si—Si bonds of the di- or oligosilanes or the Si—C-bond of the carbodisilanes is carried out, preferably in a one pot reaction simultaneously with the hydrogenation reaction a) and the redistribution reaction b). Such a cleavage reaction c) may only be suitable if the silane substrate comprises, (ii) disilanes, (iii) oligosilanes, and/or (iv) carbodisilanes having at least one chloro substituent in at least one silane.

In the process of the present invention the redistribution reaction b) is carried out in the presence of at least one redistribution catalyst.

As described above, in the present invention, the term "redistribution reaction b)" describes the redistribution of in particular hydrogen and chlorine substituents bound to silicon atoms of one or more compounds comprised by the silane substrate by the exchange of the substituents. Also an exchange of the methyl groups is possible but normally not desired or to be avoided.

Preferably, by the redistribution reaction b) from silanes bearing only chlorine substituents at the silicon atoms and silanes bearing only hydrogen substituents at the silicon atoms and/or from silanes having hydrogen and chlorine substituents at the silicon atoms, formed under reaction conditions, the yield of the desired methylchlorohydridomonosilanes is increased.

In the present invention the redistribution catalysts are normally different from the solvent used in the reaction. In some instances the redistribution catalysts can also act as hydride donating source, in particular, in the case of metal hydrides, but preferably the redistribution catalysts are different from the hydride donating source. In some instances the redistribution catalysts can also act as cleavage catalysts, but it is also possible to use a different redistribution catalyst and cleavage catalyst.

Redistribution catalysts are in particular compounds that catalyze the following reactions:

in particular the reaction

at a given temperature. For example, if $Me_2SiCl_2$ and $Me_2SiH_2$ do not react at a certain temperature but do react at that temperature in the presence of a compound, then said compound acts as a redistribution catalyst.

Preferably the redistribution catalysts are selected from the group consisting of:
- $R_4PCl$, wherein R is hydrogen or an organyl group, which can be the same or different, more preferably an aromatic group or aliphatic hydrocarbon group, even more preferably a n-alkyl group, and most preferably a n-butyl group,
- triorganophosphines, wherein R is hydrogen or an organyl group, preferably $PPh_3$ or $n-Bu_3P$,
- triorganoamines, wherein R is an organyl group, preferably $n-Bu_3N$ or $NPh_3$,
- N-heterocyclic amines, preferably non-N-substituted methylimidazoles, such as 2-methylimidazole, and 4-methylimidazole, preferred are N-heterocyclic amines with a free nucleophilic electron pair at the nitrogen atom, which means that the nucleophilicity at the nitrogen atom in such N-heterocyclic amines is not reduced by inductive or mesomeric interactions. In particular, cyclic amides are normally not suitable as redistribution catalysts,
- quaternary ammonium compounds, preferably $n-Bu_4NCl$,
- an alkali metal halide,
- an alkaline earth metal halide,
- an alkali metal hydride, and
- an alkaline earth metal hydride.

In an embodiment, one or more redistribution catalysts can be used, in particular, a combination of two redistribution catalysts is preferred.

As metal hydrides may also act as redistribution catalysts, it may not be necessary to add a redistribution catalyst in addition to the hydride donating source added in the hydrogenation reaction a). However, normally the addition of a redistribution catalyst in addition to the hydride donating source added in the hydrogenation reaction a) is preferred. According to the preferred sequences of reactions a) hydrogenation reaction, b) redistribution reaction, and c) cleavage reaction, it is preferred that the redistribution catalyst is added together with the hydride donating source and the optional cleavage catalyst.

It may be that the redistribution catalyst also acts as a cleavage catalyst, as described below, at the same time.

In a preferred embodiment the redistribution catalyst is selected from the group of:
- $R_4PCl$, wherein R is hydrogen or an organyl group, which can be the same or different, more preferably an aromatic group or aliphatic hydrocarbon group, even more preferably a n-alkyl group, and most preferably a n-butyl group,
- triorganophosphines, wherein R is hydrogen or an organyl group, preferably $PPh_3$,
- triorganoamines, wherein R is an organyl group, preferably $n-Bu_3N$,
- N-heterocyclic amines, preferably non-N-substituted methylimidazoles, such as 2-methylimidazole, and 4-methylimidazole, preferred are N-heterocyclic amines with a free nucleophilic electron pair at the nitrogen atom, which means that the nucleophilicity at the nitrogen atom in such N-heterocyclic amines is not reduced by inductive or mesomeric interactions. In particular, cyclic amides are normally not suitable as redistribution catalysts, and
- quaternary ammonium compounds, preferably $n-Bu_4NCl$.

In preferred redistribution catalysts selected from the compounds of the general formula $R_4PCl$, R is hydrogen or an organyl group and R can be the same or different, preferably R is an aromatic group, such as phenyl, tolyl, and/or an aliphatic hydrocarbon group, more preferably R is an alkyl group, such as methyl, ethyl, n-, or iso propyl, n-butyl, sec-butyl, isobutyl, tert-butyl, n-pentyl, tert-pentyl, neopentyl, isopentyl, sec-pentyl, n-, iso or sec-hexyl n-, iso or sec-heptyl, n-, iso or sec-octyl etc., even more preferably R is a n-alkyl group, and most preferably the compound of the general formula $R_4PCl$ is $n-Bu_4PCl$.

In preferred redistribution catalysts selected from triorganophosphines $PR_3$, R is hydrogen or an organyl group and can be the same or different, more preferably R is an alkyl such as described before, cycloalkyl or aryl group, most preferably the organophosphine is $PPh_3$ or $n-Bu_3P$.

In preferred redistribution catalysts selected from triorganoamines $NR_3$, R is an organyl group, more preferably R is an alkyl group, and most preferably the triorganoamine is $n-Bu_3N$ or $NPh_3$.

Preferred redistribution catalysts selected from N-heterocyclic amines are non-N-substituted methylimidazoles such as 2-methylimidazole, and 4-methylimidazole, most preferably 2-methylimidazole.

In preferred redistribution catalysts selected from quaternary ammonium compounds $NR_4Cl$, R is an organyl group and can be the same or different, more preferably R is an alkyl group, and most preferably the quaternary ammonium compound is $n-Bu_4NCl$.

In a preferred embodiment of the present invention a combination of quaternary ammonium compounds $NR_4Cl$ and methylimidazoles can be used as catalysts.

In a preferred embodiment of the present invention the optional cleavage reaction c) is carried out in the presence of at least one cleavage catalyst. Preferred cleavage catalysts are selected from the group consisting of:
 a quaternary Group 15 onium compound $R_4QX$, wherein each R is independently a hydrogen or an organyl group, Q is phosphorus, arsenic, antimony or bismuth, and X is a halide selected from the group consisting of F, Cl, Br and I,
 a heterocyclic amine,
 a heterocyclic ammonium halide,
 a mixture of $R_3P$ and RX,
 wherein R is as defined above, and X is as defined above,
 alkali metal halide,
 an alkaline earth metal halide,
 an alkali metal hydride,
 alkaline earth metal hydride or mixtures thereof, and optionally in the presence of hydrogen chloride (HCl).

It is evident that the definitions of the redistribution catalysts and the cleavage catalyst or compounds may overlap. Accordingly, as stated above, compounds acting as redistribution catalysts may also act as cleavage catalysts and vice versa. In a preferred embodiment of the invention the redistribution catalysts also act as cleavage catalyst or compounds.

It is further to be understood that also the hydride donating sources, in particular the metal hydrides, such LiH may act as cleavage compounds.

The cleavage reaction is used to describe the transformation by which disilanes (ii) such as represented by the general formula (II), oligosilanes (iii) such as represented by the general formula (III) and carbodisilanes (iv) such as represented by the general formula (IV) are reacted to produce monomeric silanes. In the case of disilanes of the general formula (II) and oligosilanes of the general formula (III), the term "cleavage reaction of the silicon-silicon bond(s)" further indicates that according to the present invention, the cleavage of the aforementioned substrates is effected by breaking the bond connecting the silicon atoms of these disilanes and oligosilanes. In the case of carbodisilanes of the general formula (III), the term "cleavage reaction of the silicon-carbon bonds" indicates that the cleavage reaction is effected by breaking one or both bonds between the silyl groups of the compounds and the methylene group linking the silyl groups. Such cleavage processes comprise in particular hydrochlorination and hydrogenolysis reactions.

The cleavage reaction is preferably carried out in the presence of one or more cleavage catalyst compounds.

Preferably, the cleavage catalysts compounds are selected from the group of
 a quaternary Group 15 onium compound $R_4QX$, wherein each R is independently a hydrogen or an organyl group, Q is phosphorus, arsenic, antimony or bismuth, and X is a halide selected from the group consisting of F, Cl, Br and I,
 a heterocyclic amine,
 a heterocyclic ammonium halide,
 a mixture of $R_3P$ and RX, wherein R is as defined above, and X is as defined above,
 alkali metal halides,
 alkaline earth metal halides,
 alkali metal hydride or alkaline earth metal hydride, and optionally
 in presence of hydrogen chloride (HCl).
 and
 mixtures of the above-mentioned compounds.

It has been found that the cleavage catalysts under certain conditions also can act as reactants, i.e. they are consumed in the cleavage reactions, and that by virtue of this the amount of desirable hydridomonosilanes, such as $Me_2SiHCl$ in particular, is significantly increased. Therefore, the cleavage catalysts are sometimes also referred to as cleavage compounds.

The cleavage reaction under certain circumstances may be also affected in the presence of hydrogen chloride (HCl), in particular, in the presence of hydrogen chloride and an ether compound such as the ether solvents described above.

Preferred cleavage catalysts or cleavage compounds include, but are not limited to:
 phosphonium chlorides $R_4PCl$, wherein R is hydrogen or an organyl group, which can be the same or different, more preferably an aromatic group or aliphatic hydrocarbon group, even more preferably a n-alkyl group, and most preferably a n-butyl group,
 N-heterocyclic amines, more preferably methylimidazoles, such as 2-methylimidazole, 4-methylimidazole and 1-methylimidazole, and
 quaternary ammonium compounds, more preferably $n-Bu_4NCl$,
 and mixtures thereof.

As explained above, it may be that hydrogenation reaction a), redistribution reaction b) and cleavage reaction c) may be affected by only adding the hydride donating source, because the hydride donating source or the reaction products thereof such as metal halides may also act as catalysts for the redistribution reaction b) and the cleavage reaction c); optionally HCl may be added to support the cleavage reaction.

Regarding the molar ratio of the redistribution catalyst in relation to the silane substrate compounds it is preferably in the range of about 0.0001 mol-% to about 600 mol-%, more preferably about 0.01 mol-% to about 20 mol-%, even more preferably about 0.05 mol-% to about 2 mol-%, and most preferably about 0.05 mol-% to about 1 mol-%.

Herein, the molar ratio in % is defined as [n (molar amount of the redistribution catalyst)/n (molar amount of the silane substrate compounds of the general formulae (I), (II), (III) and (IV))]×100.

For the determination of this ratio, all redistribution catalysts are considered, and all silane substrate compounds of the general formulae (I), (II), (III) and (IV), regardless if they are submitted as a part of a mixture comprising other silane compounds, which do not fall under the general formulae (I), (II), (III) or (IV).

Likewise the molar ratio of the cleavage catalyst in relation to the silane substrate compounds is preferably in the range of about 0.0001 mol-% to about 600 mol-%, more preferably about 0.01 mol-% to about 20 mol-%, even more preferably about 0.05 mol-% to about 2 mol-%, and most preferably about 0.05 mol-% to about 1 mol-%.

Herein, the molar ratio in % is defined as

[$n$(molar amount of the cleavage catalyst)/$n$(molar amount of the silane substrate compounds of the general formulae (I), (II), (III) and (IV))]×100.

These amounts also apply in case that a compound is applied which acts as both a redistribution catalyst and as cleavage catalyst compound.

In a preferred embodiment according to the invention the redistribution catalyst has the formula $R_4PCl$.

Preferably, in the formula $R_4PCl$, R is a hydrogen or an organyl group which can be the same or different, more preferably R is an aromatic group or an aliphatic hydrocarbon group, even more preferably R is an alkyl or cycloalkyl group, even further preferably R is a n-alkyl group, and most preferably the compound of the general formula $R_4PCl$ is $n$-$Bu_4PCl$.

In another preferred embodiment according to the invention, the compounds of formula $R_4PCl$ are formed in situ from compounds of the formulae $R_3P$ and RCl, wherein R is H or an organyl group.

According to the invention, R in $R_4PCl$ formed in situ can be the same or different, and preferably R is the same and RCl is HCl or a chloroalkane, more preferably RCl is a 1-chloroalkane with up to about 20 carbon atoms, even more preferably RCl is a 1-chloroalkane with up to about 10 carbon atoms, and most preferably RCl is 1-chlorobutane.

The term "formed in situ" as used herein means that the compound $R_4PCl$ is formed from $R_3P$ and RCl by combination of the compounds in the reaction vessel in which reaction step A) is performed.

In an also preferred embodiment according to the invention, the process is carried out in the presence of at least one compound of the formula $R_4PCl$ and lithium hydride.

Preferably, the invention is carried out in the presence of lithium hydride and at least one compound of the formula $R_4PCl$, wherein R is an organyl group and can be the same or different.

In a further preferred embodiment according to the invention, the process is carried out in the presence of n-$Bu_4PCl$.

In the present invention, n-$Bu_4PCl$ was found to be a particularly effective redistribution catalyst.

Preferably, the invention is carried out in the presence of n-$Bu_4PCl$ and in the presence of lithium hydride as alkaline metal hydride, more preferably in the presence of lithium hydride and a high-boiling ether compound, most preferably in the presence of lithium hydride and a high-boiling ether compound selected from the group of diglyme, tetraglyme and 1,4-dioxane.

In a preferred embodiment of the present invention the hydrogenation reaction a), the redistribution reaction b), and optionally the cleavage reaction c) are carried out simultaneously and/or stepwise, preferably simultaneously.

In a most preferred embodiment the entire product composition of a Müller-Rochow Direct Process is subjected to the simultaneous hydrogenation reaction a), redistribution reaction b), and cleavage reaction c), and from the resulting product the desired methylchlorohydridomonosilanes are isolated by fractional distillation.

However, depending on the particular silane substrate used in the process of the present invention specifically adapted reaction sequences can be selected for example from one or more of the following process options:

the hydrogenation reaction a) and the redistribution reaction b) are carried out simultaneously, the optional cleavage reaction c) is carried out subsequently, the hydrogenation reaction a), the redistribution reaction b) and the cleavage reaction c) are carried out simultaneously, at first the hydrogenation reaction a) is carried out separately, and then the redistribution reaction b) and optionally the cleavage reaction c) are carried out simultaneously or separately, optionally in this embodiment after the hydrogenation reaction a) the already formed methylchlorohydridomonosilanes can be separated, before inducing the redistribution reaction b) and the optional cleavage reaction c), at first the hydrogenation reaction a) is carried out, then optionally the cleavage reaction c) is carried out, and then the redistribution reaction b) is carried out, optionally in this embodiment after the hydrogenation reaction a) the already formed methylchlorohydridomonosilanes can be separated, before inducing the cleavage reaction c) and the redistribution reaction b), the silane substrate is selected from monosilanes, and such substrate is subjected first to the hydrogenation reaction a), and subsequently to the redistribution reaction b), or such substrate is subjected to the hydrogenation reaction a), and the redistribution reaction b) simultaneously.

It is evident that if a monosilane substrate (such as the monosilanes of formula (I)) is applied that the cleavage reaction is normally dispensable.

The integrated process of the present invention to prepare the methylchlorohydridomonosilanes thus offers a great flexibility towards any kind of chlorine-containing silane substrates as described above as obtained in particular as product (or partial product) of the Müller-Rochow Direct Process.

In a preferred embodiment of the present invention the process comprises the additional step of separating the monosilanes having more than one hydrogen atom, in particular, the perhydrated methylmonosilanes, such as $Me_2SiH_2$ and $MeSiH_3$, which are then subjected to a reaction selected from the group consisting of:

a chlorination reaction, preferably with ether/HCl, and/or
a redistribution reaction with silanes comprising at least one chlorine atom, for which
the redistribution catalysts can be used as described above.

In this embodiment also the solvents can be applied as described above.

In another preferred embodiment of the present invention the process comprises the additional step of separating disilanes and/or oligosilanes each having at least one hydrogen atom, which are then subjected to a reaction, selected from the group consisting of:

a cleavage reaction, preferably in the presence ether/HCl, and/or a redistribution reaction with silanes comprising at least one chlorine atom.

In these reactions the redistribution catalysts and the cleavage catalyst and also the solvents as described above can be applied.

In a further preferred embodiment of the invention the process comprises the step of separating carbodisilanes having at least one hydrogen atom, which are then subjected to a reaction selected from the group consisting of:

a cleavage reaction, preferably in the presence of a metal hydride, and/or a redistribution reaction with silanes comprising at least one chlorine atom.

For those reactions the metal hydrides, the redistribution catalysts and solvents each as described above can be used.

If $Me_3SiH$ is desired as a by-product, in a further preferred embodiment of the present invention the process comprises the step of separating $Me_3SiH$, in particular, after the hydrogenation reaction a).

As described above in an embodiment of the process of the present invention the most preferred hydride donating source is LiH, which is converted into lithium chloride (LiCl).

In a particular preferred embodiment of such process using lithium hydride the LiCl formed is separated and subjected to the steps of purification, optionally mixing with KCl to prepare the LiCl—KCl eutectic composition, electrolysis of the eutectic or molten LiCl to obtain metallic Li and regeneration of LiH from the Li so prepared.

It is the particular advantage of this embodiment that it renders the process of the present invention economical and efficient including in particular in the conversion reaction (Di→M2H), by recycling and valorizing the accruing LiCl and converting it back into LiH.

Therefore, the costs of the Li-metal appearing in both components (LiH and LiCl) is eliminated from the overall cost consideration and only the conversion costs involved in converting LiCl back into LiH is to be considered. In addition, the recycling is going along with the incumbent manufacturing route for LiH. In fact, the hydride material is made from LiCl in two sequential steps: a) electrolysis of the LiCl in the form of an eutectic system (with, e.g. KCl, Downs-Cell/Process) resulting in Li-metal; followed by step b) the hydrogenation of the Li-metal at elevated temperatures with hydrogen gas ($H_2$), which results into LiH (schematically):

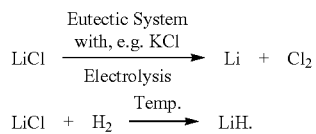

(Complete Stoichiometry:

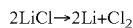

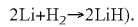

Other metal hydride sources form by-products which need to be extensively removed (e.g. in case of $LiAlH_4 \rightarrow LiCl$ and $AlCl_3$) and thus costly purification steps will interfere with the economy of the process. Furthermore, the formation of $AlCl_3$ is not desired as its presence induces the redistribution of Me-groups, which will lead to a broadly distributed product mixture (see, e.g. U.S. Pat. No. 5,856,548 or 5,654,459A).

The process of the present invention is preferably carried out at a temperature in the range of about −40° C. to about 250° C. Even more preferably the process of the present invention is carried out at least two different temperatures, preferably at a first temperature which is lower than a second temperature. The temperatures are usually selected in accordance with the requirements of the hydrogenation reaction a), the redistribution reaction b) and the optional cleavage reaction c).

In a preferred embodiment of the process according to the invention, the reactions (hydrogenation reaction, redistribution reaction, and the optional cleavage reaction) are carried out for more than a total time of about 4 hours, preferably more than about 6 hours, preferably more than about 10 hours and preferably more than about 12 hours.

In further preferred embodiment of the process according to the invention, the reactions (hydrogenation reaction, redistribution reaction, and the optional cleavage reaction) are carried out for more than a total time of about 4 hours, preferably more than about 6 hours at a temperature which at least partly exceeds at least about 200° C., or the reactions in step A) is carried out for more than about 10 hours preferably more than about 12 hours, at a temperature which at least partly exceeds at least about 100° C., preferably more than about 150° C.

The process according to the present invention is preferably carried out at a pressure from about 0.1 to about 10 bar.

The process of the present invention is preferably carried out under inert conditions.

The process of the present invention can be carried out continuously or discontinuously, such as batchwise.

In an embodiment, the process of the present invention includes a separating step to separate the methylchlorohydridosilanes. In a preferred embodiment of the process according to the invention, the step of separating the methylchlorohydridosilanes is carried out by distillation and/or condensation.

The term "distillation" according to the present invention relates to any process for separating components or substances from a liquid mixture by selective evaporation and condensation.

Therein, distillation may result in practically complete separation of the constituents of a mixture, thus leading to the isolation of nearly pure compounds, or it may be a partial separation that increases the concentration of selected constituents of the mixture in the distillate when compared to the mixture submitted to distillation.

Preferably, the distillation processes can be simple distillation, fractional distillation, vacuum distillation, short path distillation or any other kind of distillation known to the ordinary skilled person.

Also preferably, the step of separating the methylchlorohydridosilanes according to the invention can comprise one or more batch distillation steps, or can comprise a continuous distillation process.

Further preferably, the term "condensation" may comprise separation or enrichment of the methylchlorohydridosilanes from the reaction mixture by volatilization from the reaction vessel and condensation as a liquid and/or solid in a refrigerated vessel from which it can be subsequently recovered by distillation, or by solution in an ether solvent.

Alternatively preferred, the methylchlorohydridosilanes can be absorbed in an ether solvent contained in a refrigerated vessel.

In a preferred embodiment of the process according to the invention, the process is performed under inert conditions.

In accordance with the present invention, the term "performed under inert conditions" means that the process is partially or completely carried out under the exclusion of surrounding air, in particular of moisture and oxygen. In order to exclude ambient air from the reaction mixture and the reaction products, closed reaction vessels, reduced pressure and/or inert gases, in particular nitrogen or argon, or combinations of such means may be used.

PREFERRED EMBODIMENTS OF THE INVENTION

In the following the preferred embodiments of the invention are summarized:

1. A process for the manufacture of methylchlorohydridomonosilanes, selected from $Me_2Si(H)Cl$, $MeSi(H)Cl_2$, and $MeSi(H)_2Cl$, preferably $Me_2Si(H)Cl$, and $MeSi(H)Cl_2$, and most preferably $Me_2Si(H)Cl$, comprising:
   subjecting a silane substrate comprising at least one silane selected from the group consisting of:
   (i) Monosilanes,
   (ii) Disilanes,
   (iii) Oligosilanes,
   (iv) Carbodisilanes,
   with the proviso that at least one of the silanes (i) to (iv) has at least one chloro substituent,
   a) to a hydrogenation reaction with at least one hydride donating source, and
   b) to a redistribution reaction, and
   c) optionally to a cleavage reaction of the Si—Si bonds of the di- or oligosilanes or the Si—C-bond of the carbodisilanes, and
   d) to a separating step of the methylchlorohydridosilanes.
   wherein the process is carried out in the presence of one or more solvents, preferably selected from ether solvents, in the absence of $AlCl_3$, (also preferably in the absence of a transition metal compound and even more in the absence of any metal compound except for the metal compounds used as hydride donating source, redistribution catalysts, or cleavage catalysts as described herein), wherein
   (i) the monosilanes are selected from the general formula (I), $$Me_xSiH_yCl_z \qquad (I),$$

wherein
   x=1 to 3,
   y=0 to 3,
   z=0 to 3, and
   x+y+z=4,
   (ii) the disilanes are selected from the general empirical formula (II), $$Me_mSi_2H_nCl_o \qquad (II)$$

wherein
   m=1 to 6,
   n=0 to 5
   o=0 to 5 and
   m+n+o=6,
   (iii) oligosilanes are selected from linear or branched oligosilanes of the general empirical formula (III)

$$Me_pSi_qH_rCl_s \qquad (III),$$

wherein
   q=3-7
   p=q to (2q+2)
   r, s=0 to (q+2)
   r+s=(2q+2)-p,
   (iv) carbodisilanes are selected from the general formula (IV)

$$(Me_aSiH_bCl_e)-CH_2-(Me_cSiH_dCl_f) \qquad (IV)$$

wherein
   a, c are independently of each other 1 to 3,
   b, d are independently from each other 0 to 2
   e, f are independently from each other 0 to 2,
   a+b+e=3,
   c+d+f=3.

2. A process according to the embodiment 1, wherein the silane substrate is consisting of the silanes of formulas (I) to (IV). More preferably the silane substrate is $Me_2SiCl_2$.

3. A process according to any of the previous embodiments, wherein
   (i) the monosilanes are selected from the formulas: $MeSiCl_3$, $Me_2SiCl_2$, $Me_3SiCl$, $MeSiHCl_2$, $Me_2SiHCl$, $MeSiH_2Cl$, $MeSiH_3$, $Me_2SiH_2$ and $Me_3SiH$,
   (ii) the disilanes are selected from the formulas:
   $Cl_2MeSi-SiMeCl_2$, $Cl_2MeSi-SiMe_2Cl$, $Cl_2MeSi-SiMe_3Cl$$Me_2Si-SiMe_2Cl$, $Me_3Si-SiMe_2Cl$, $HMe_2Si-SiMe_2Cl$,
   $H_2MeSi-SiMeClH$, $HClMeSi-SiMeClH$, $ClHMeSi-SiMeCl_2$, $H_2MeSi-SiMeCl_2$, $HMe_2Si-SiMeCl_2$, $ClMe_2Si-SiMeH_2$, $HMe_2Si-SiMeClH$, $ClMe_2Si-SiMeClH$, $Me_3Si-SiMeClH$, $HMe_2Si-SiMe_2H$, $H_2MeSi-SiMeH_2$, $HMe_2Si-SiMeH_2$, $Me_3Si-SiMeH_2$ and $Me_3Si-SiMe_2H$,
   (iii) oligosilanes are selected from the formulas:
   $ClMe_2Si-SiMe_2-SiMe_2Cl$, $ClMe_2Si-SiMe_2-SiMe_2Cl$, $(ClMe_2Si)_3SiMe$, $(Cl_2MeSi)_2SiMeCl$, $(Cl_2MeSi)_3SiMe$, $(Cl_2MeSi)_2SiMe-SiClMe-SiCl_2Me$, $[(Cl_2MeSi)_2SiMe]_2$, $[(Cl_2MeSi)_2SiMe]_2SiClMe$, $(Cl_2MeSi)_2SiMe-SiMe_2Cl$, $ClMe_2Si-SiMe_2SiMe_2H$, $HMe_2Si-SiMe_2-SiMe_2H$, $HMe_2Si-SiMe_2-SiMe_2H$, $(HMe_2Si)_3SiMe$, $(H_2MeSi)_2SiMeH$, $(H_2MeSi)_3SiMe$, $(H_2MeSi)_2SiMe-SiHMe-SiH_2Me$, $[(H_2MeSi)_2SiMe]_2$, $[(H_2MeSi)_2SiMe]_2SiHMe$ and $(H_2MeSi)_2SiMe-SiMe_2H$,
   (iv) the carbodisilanes are selected from the formulas:
   $Cl_2MeSi-CH_2-SiMeCl_2$, $ClMe_2Si-CH_2-SiMeCl_2$, $ClMe_2Si-CH_2-SiMe_2Cl$, $Me_3Si-CH_2-SiMeCl_2Me_3Si-CH_2-SiMe_2Cl$, $HClMeSi-CH_2-SiMeClH$, $HMe_2Si-CH_2-SiMeCl_2$, $HMe_2Si-CH_2-SiMe_2Cl$, $Me_3Si-CH_2-SiMeClH$, $H_2MeSi-CH_2-SiMeH_2$, $HMe_2Si-CH_2-SiMeH_2$, $HMe_2Si-CH_2-SiMe_2H$, $Me_3Si-CH_2-SiMeH_2$, and $Me_3Si-CH_2-SiMe_2H$
   with the proviso that at least one of the silanes used in the process has at least one chloro substituent.

4. A process according to any of the previous embodiments, wherein the silane substrate comprises at least one silane selected from the group consisting of disilanes (ii), oligosilanes (iii), and carbodisilanes (iv).

5. A process according to any of the previous embodiments, wherein the silane substrate comprises at least one, preferably more than one silane selected from the group consisting of $MeSiCl_3$, $Me_2SiCl_2$, $Me_3SiCl$, $MeSiHCl_2$, $Me_2SiHCl$, $MeSiH_2Cl$, $MeSiH_3$, $Me_2SiH_2$, $Me_3SiH$, $Cl_2MeSi-SiMeCl_2$, $Cl_2MeSi-SiMe_2Cl$, $Cl_2MeSi-SiMe_3$, $ClMe_2Si-SiMe_2Cl$, $Me_3Si-SiMe_2C$, $Cl_2MeSi-CH_2-$ SiMeCl$_2$, ClMe$_2$Si—CH$_2$—SiMeCl$_2$, ClMe$_2$Si—CH$_2$—SiMe$_2$Cl, Me$_3$Si—CH$_2$—SiMeCl$_2$ and Me$_3$Si—CH$_2$—SiMe$_2$Cl.

6. A process according to any of the previous embodiments wherein the process is carried out in the presence of one or more ether solvents.

7. A process according to any of the previous embodiments, wherein the hydride donating source is selected from metal hydrides, preferably lithium hydride.

8. A process according to any of the previous embodiments, wherein a cleavage reaction c) of the Si—Si bonds of the di- or oligosilanes or the Si—C-bond of the carbodisilanes is carried out.

9. A process according to any of the previous embodiments, wherein the redistribution reaction b) is carried out in the presence of at least one redistribution catalyst.

10. A process according to any of the previous embodiments, wherein the redistribution reaction b) is carried out in the presence of at least one redistribution catalyst selected from the group consisting of:
    R$_4$PCl, wherein R is hydrogen or an organyl group, which can be the same or different, more preferably an aromatic group or aliphatic hydrocarbon group, even more preferably a n-alkyl group, and most preferably a n-butyl group,
    triorganophosphines, wherein R is hydrogen or an organyl group, preferably PPh$_3$ or n-Bu$_3$P,
    triorganoamines, wherein R is an organyl group, preferably n-Bu$_3$N or NPh$_3$,
    N-heterocyclic amines, preferably non-N-substituted methylimidazoles, such as 2-methylimidazole, and 4-methylimidazole,
    quaternary ammonium compounds, preferably n-Bu$_4$NCl,
    an alkali metal halide,
    an alkaline earth metal halide,
    an alkali metal hydride, and
    an alkaline earth metal hydride.

11. A process according to any of the previous embodiments, wherein the cleavage reaction c) is carried out in the presence of at least one cleavage catalyst.

12. A process according to any of the previous embodiments, wherein the cleavage reaction c) is carried out in the presence of at least one cleavage catalyst selected from the group consisting of:
    a quaternary Group 15 onium compound R$_4$QX, wherein each R is independently a hydrogen or an organyl group, Q is phosphorus, arsenic, antimony or bismuth, and X is a halide selected from the group consisting of F, Cl, Br and I,
    a heterocyclic amine,
    a heterocyclic ammonium halide,
    a mixture of R$_3$P and RX,
    wherein R is as defined above, and X is as defined above,
    alkali metal halide,
    an alkaline earth metal halide,
    an alkali metal hydride,
    alkaline earth metal hydride or mixtures thereof,
    optionally in the presence of hydrogen chloride (HCl).

13. A process according to any of the previous embodiments, wherein the hydrogenation reaction a), the redistribution reaction b), and optionally the cleavage reaction c) are carried out simultaneously and/or stepwise, preferably simultaneously.

14. A process according to any of the previous embodiments, wherein the reaction sequence is selected from one or more of the following process options:

the hydrogenation reaction a) and the redistribution reaction b) are carried out simultaneously, the optional cleavage reaction c) is carried out subsequently, the hydrogenation reaction a), the redistribution reaction b) and the cleavage reaction c) are carried out simultaneously, at first the hydrogenation reaction a) is carried out separately, and then the redistribution reaction b) and optionally the cleavage reaction c) are carried out simultaneously or separately, optionally in this embodiment after the hydrogenation reaction a) the already formed methylchlorohydridomonosilanes can be separated, before inducing the redistribution reaction b) and the optional cleavage reaction c), at first the hydrogenation reaction a) is carried out, then optionally the cleavage reaction c) is carried out, and then the redistribution reaction b) is carried out, optionally in this embodiment after the hydrogenation reaction a) the already formed methylchlorohydridomonosilanes can be separated, before inducing the cleavage reaction c) and the redistribution reaction b), the silane substrate is selected from monosilanes, and such substrate is subjected first to the hydrogenation reaction a), and subsequently to the redistribution reaction b), or such substrate is subjected to the hydrogenation reaction a), and the redistribution reaction b) simultaneously.

15. A process according to any of the previous embodiments, wherein the methylchlorohydridosilanes are separated after the hydrogenation step a).

16. A process according to any of the previous embodiments, wherein the silane substrate comprises a product of the Müller-Rochow Direct Process.

17. A process according to any of the previous embodiments, wherein the silane substrate comprises the entire product of the Müller-Rochow Direct Process or a part (fraction) of the product of the Müller-Rochow Direct Process.

18. A process according to any of the previous embodiments, wherein the silane substrate comprises the monosilane fraction of the Müller-Rochow Direct Process product.

19. A process according to any of the previous embodiments, wherein the silane substrate is the higher silane fraction (silanes having ≥2 Si atoms) of the Müller-Rochow Direct Process product.

20. A process according to any of the previous embodiments, wherein the silane substrate is the oligosilane fraction (silanes having ≥3 Si atoms) and the carbodisilane fraction of the Müller-Rochow Direct Process product.

21. A process according to any of the previous embodiments, wherein the silane substrate is the higher silane fraction (silanes having ≥2 Si atoms) of the Müller-Rochow Direct Process product from which at least one component has been separated completely or partially, which component is selected from the group consisting of disilanes having ≥3 chlorine atoms and disilanes having ≥3 methyl groups.

22. A process according to any of the previous embodiments, wherein the silane substrate comprises a fraction of the Müller-Rochow Direct Process product, from which at least one component has been separated completely or partially, which component is selected from the group consisting of Me$_n$SiCl$_{4-n}$, wherein n=1-3, Me$_2$Si(H)Cl, MeSi(H)Cl$_2$, and MeSi(H)$_2$Cl.

23. A process according to any of the previous embodiments, which comprises the additional step of separating the monosilanes having more than one hydrogen atom, and are subjected to a reaction selected from the group consisting of:

a chlorination reaction, preferably with ether/HCl, and/or
a redistribution reaction with silanes comprising at least one chlorine atom.

24. A process according to any of the previous embodiments, which comprises the additional step of separating disilanes and/or oligosilanes each having at least one hydrogen atom, which are subjected to a reaction selected from the group consisting of:
a cleavage reaction, preferably in the presence ether/HCl, and/or
a redistribution reaction with silanes comprising at least one chlorine atom.

25. A process according to any of the previous embodiments, which comprises the step of separating carbodisilanes having at least one hydrogen atom, which are subjected to a reaction selected from the group consisting of:
a cleavage reaction, preferably in the presence of a metal hydride, and/or
a redistribution reaction with silanes comprising at least one chlorine atom.

26. A process according to any of the previous embodiments, which comprises the step of separating Me$_3$SiH.

27. A process according to any of the previous embodiments, wherein the hydride donating source is LiH.

28. A process according to any of the previous embodiments, wherein the hydride donating source is LiH, and which process comprises the step of separating the LiCl formed.

29. A process according to any of the previous embodiments, wherein the hydride donating source is LiH, and which process comprises the step of separating the LiCl formed and the step of regeneration of LiH from the separated LiCl.

30. A process according to any of the previous embodiments, wherein the process is carried out at a temperature in the range of about −40° C. to about 250° C.

31. A process according to any of the previous embodiments, wherein the process is carried out at at least two different temperatures, preferably at a first temperature which is lower than a second temperature.

32. A process according to any of the previous embodiments, wherein the process is carried out at a pressure from about 0.1 to about 10 bar.

33. A process according to any of the previous embodiments, wherein the process is carried out under inert conditions.

34. A process according to any of the previous embodiments, wherein the process is carried out continuously or discontinuously, such as batchwise.

35. Methylchlorohydridomonosilanes, selected from Me$_2$Si(H)Cl, MeSi(H)Cl$_2$, and MeSi(H)$_2$Cl, as obtainable by the process according to any of the previous embodiments.

36. Compositions, comprising at least one methylchlorohydridomonosilane, selected from Me$_2$Si(H)Cl, MeSi(H)Cl$_2$, and MeSi(H)$_2$Cl, as obtainable by the process according to any of the previous embodiments.

It will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims appended hereto.

The process of the present invention will be explained in more detail by the following examples.

EXAMPLES

The present invention is further illustrated by the following examples, without being limited thereto.

General

Various silane substrates as formed in the Direct Process of formation of methylchlorosilanes were reacted. All reactants and solvents used were carefully dried according to procedures known from literature. The reactions investigated were generally performed in sealed NMR tubes first to prevent evaporation of low boiling reaction products, and to elucidate the reaction conditions (temperature, time) for silicon-silicon bond cleavage. Subsequently, these conditions were exemplarily transferred to a preparative scale: (i) in a closed system, preferably a sealed glass ampoule to avoid evaporation of low boiling reaction educts and products, e.g. organo chloro- and organo hydridosilanes. After the reactions were completed, the ampoule was frozen opened under vacuum and products formed were isolated by combined condensation/disitillation procedures. (ii) in an open system, preferably a multi-necked flask, equipped with a magnetic stirrer, thermometer, dropping funnel, and a reflux condenser that was connected with a cooling trap to collect low boiling reaction products. Products formed were isolated by combined condensation/distillation procedures. Products were analyzed and characterized by standard procedures, especially by NMR spectroscopy and GC/MS analyses.

Identification of Products

Products were analyzed by $^1$H, $^{29}$Si and $^1$H-$^{29}$Si-HSQC NMR spectroscopy. The spectra were recorded on a Bruker AV-500 spectrometer equipped with a Prodigy BBO 500 S1 probe. $^1$H-NMR spectra were calibrated to the residual solvent proton resonance ([D$_6$]benzene $\delta_H$=7.16 ppm). Product identification was additionally supported by GC-MS analyses and verified identification of the main products. GC-MS analyses were measured with a Thermo Scientific Trace GC Ultra coupled with an ITQ 900MS mass spectrometer. The stationary phase (Machery-Nagel PERMABOND Silane) had a length of 50 m with an inner diameter of 0.32 mm. 1 µl of analyte solution was injected, ⅕₂₅ thereof was transferred onto the column with a flow rate of 1.7 mL/min carried by helium gas. The temperature of the column was first kept at 50° C. for 10 minutes. Temperature was then elevated at a rate of 20° C./min up to 250° C. and held at that temperature for another 40 minutes. After exiting the column, substances were ionized with 70 eV and cationic fragments were measured within a range of 34-600 m/z (mass per charge). Product mixtures were diluted with benzene prior to the measurement.

The characteristic $^{29}$Si-NMR chemical shifts and coupling constants $^1J\{^{29}Si\text{-}^1H\}$ for the starting materials reacted with the alkali- and alkaline earth metal salts and the products formed, are listed in Table 1.

TABLE 1

Identification of starting materials and products

| No. | Compound Si$^A$—Si$^B$ | δ $^{29}$Si [ppm] A | B | $^1J$ (Si—H) [Hz] A | B |
|---|---|---|---|---|---|
| 1 | Cl$_2$MeSi—SiMeCl$_2$ | 17.5 | | — | |
| 2 | ClMe$_2$Si—SiMeCl$_2$ | 15.0 | 24.6 | — | |
| 3 | ClMe$_2$Si—SiMe$_2$Cl | 17.1 | | — | |
| 4 | Me$_3$Si—SiMeCl$_2$ | 34.0 | −14.1 | — | |
| 5 | Me$_3$Si—SiMe$_2$Cl | 22.5 | −18.6 | — | |
| 6 | Me$_3$Si—SiMe$_3$ | −20.1 | | — | |
| 7 | MeSiCl$_3$ | 12.3 | | — | |
| 8 | MeSiHCl$_2$ | 10.9 | | 280.2 | |
| 9 | MeSiH$_2$Cl | −11.4 | | 229.4 | |
| 10 | MeSiH$_3$ | −65.5 | | 194.1 | |
| 11 | Me$_2$SiCl$_2$ | 31.5 | | — | |
| 12 | Me$_2$SiHCl | 11.0 | | 223.3 | |
| 13 | Me$_2$SiH$_2$ | −38.1 | | 187.6 | |
| 14 | Me$_3$SiCl | 30.1 | | — | |
| 15 | Me$_3$SiH | −16.6 | | 182.9 | |
| 16 | H$_2$MeSi—SiMeH$_2$ | −67.8 | | 185.8 | |
| 17 | HMe$_2$Si—SiMeH$_2$ | −39.9 | −66.7 | 180.9 | 180.5 |
| 18 | HMe$_2$Si—SiMe$_2$H | −39.5 | | 177.5 | |
| 19 | Me$_3$Si—SiMeH$_2$ | −18.3 | −66.0 | — | 177.7 |
| 20 | Me$_3$Si—SiMe$_2$H | −19.2 | −39.4 | — | 172.5 |
| 21 | ClMe$_2$Si—SiMe$_2$H | 23.0 | −39.0 | — | 176.4 |
| 22 | Cl$_2$MeSi—SiMeClH | 23.8 | −6.7 | — | 227.4 |
| 23 | HClMeSi—SiMeClH | −3.9 | −4.3 | 211.7 | |
| 24 | Cl$_2$MeSi—SiMeH$_2$ | 32.1 | −61.4 | — | 196.7 |
| 25 | HClMeSi—SiMeH$_2$ | 0.6 | −64.7 | 215.0 | 203.3 |
| 26 | ClMe$_2$Si—SiMeClH | 17.6 | −3.7 | — | 221.3 |
| 27 | Cl$_2$MeSi—SiMe$_2$H | 33.8 | −35.5 | — | 191.3 |
| 28 | ClMe$_2$Si—SiMeH$_2$ | 22.6 | −64.6 | — | 195.6 |
| 29 | HMe$_2$Si—SiMeClH | 1.83 | −38.2 | 181.3 | 198.4 |
| 30 | Cl$_2$MeSi—CH$_2$—SiMeCl$_2$ | 26.2 | | — | |
| 31 | ClMe$_2$Si—CH$_2$—SiMeCl$_2$ | 28.1 | 25.7 | — | — |
| 32 | ClMe$_2$Si—CH$_2$—SiMe$_2$Cl | 28.3 | | — | |
| 33 | Me$_3$Si—CH$_2$—SiMeCl$_2$ | 30.6 | −0.5 | — | — |
| 34 | Me$_3$Si—CH$_2$—SiMe$_2$Cl | 30.0 | −0.4 | — | — |
| 35 | Me$_3$Si—CH$_2$—SiMe$_3$ | −0.5 | | — | |

Example 1

LiH (3.0 mmol), Me$_2$SiCl$_2$ (1.7 mmol), tetraglyme (0.35 ml) and catalytic amounts of n-Bu$_4$PCl (0.02 mmol) were placed in an NMR tube cooled to −196° C. (liquid nitrogen). After evacuation the NMR tube was sealed and warmed to r.t. The starting materials reacted upon heating the sample, and the reaction course of the chlorosilane reduction/redistribution reaction was monitored by NMR spectroscopy.

TABLE 2

| no. | silane | 80° C., 0.25 h | 120° C., +2 h | 120° C., +2.5 h | 120° C., +6 h |
|---|---|---|---|---|---|
| 13 | Me$_2$SiH$_2$ | 31 | 35 | 47 | 55 |
| 11 | Me$_2$SiCl$_2$ | 57 | 20 | 7 | 3 |
| 12 | Me$_2$SiHCl | 12 | 45 | 46 | 42 |

As can be seen from Table 2, the formation of hydridosilane (13) was steadily increasing with increasing reaction temperature and time. The maximum molar amount (in %) of chlorosilane 12 (Me$_2$Si(H)Cl) essentially formed by redistribution of hydridosilane (13) with dichlorosilane 11 is about 46%. At 120° C./10 h the molar amount of Me$_2$SiCl$_2$ was reduced to only 3% yield, thus being hardly available for further redistribution with Me$_2$SiH$_2$, present in 55 mol-% under these reaction conditions. As mentioned above Me$_2$SiH$_2$ can be in turn subjected to a chlorination reaction preferably with ether/HCl or a redistribution reaction with silanes comprising at least one chlorine atom, for which the redistribution catalysts can be used as described above.

Example 2

The reaction was performed in an analogous manner to the reaction of Example 1 except for using diglyme as solvent.

Table 3 covers the experimental findings of running the reaction as described. The yield of the target compound 12 was 55% at 120° C./+2 h.

TABLE 3

| no. | silane | 80° C., 0.25 h | 120° C., +2 h | 120° C., +2.5 h | 120° C., +6 h |
|---|---|---|---|---|---|
| 13 | Me$_2$SiH$_2$ | 37 | 24 | 36 | 45 |
| 11 | Me$_2$SiCl$_2$ | 51 | 21 | 13 | 5 |
| 12 | Me$_2$SiHCl | 12 | 55 | 51 | 50 |

Example 3

In analogy to the reaction of Example 1, MeSiCl$_3$ (1.7 mmol), tetraglyme (0.35 ml) and catalytic amounts of n-Bu$_4$PCl (0.02 mmol) were placed in an NMR tube, cooled to −196° C. (liquid nitrogen), then LiH (2.5 mmol) was added; the NMR tube was evacuated, sealed and warmed to r.t. The starting materials reacted upon heating the sample, and the course of the chlorosilane reduction/redistribution reaction was monitored by NMR spectroscopy.

TABLE 4

| no. | silane | 80° C., 0.25 h | 120° C., +2 h | 120° C., +2.5 h | 120° C., +6 h | 120° C., +60 h |
|---|---|---|---|---|---|---|
| 7 | MeSiCl$_3$ | 55 | 33 | 12 | 8 | 3 |
| 8 | MeSiH$_2$Cl | — | — | 14 | 23 | 32 |
| 9 | MeSiHCl$_2$ | 45 | 67 | 74 | 67 | 60 |
| 10 | MeSiH$_3$ | — | — | — | 2 | 5 |

As listed in Table 4, the molar amount of methyltrichlorosilane (7) was steadily decreasing with increasing reaction temperatures and reaction times, and the amount of the target compound MeSiHCl$_2$ (9) increased to 74%, while MeSiH$_2$Cl (8) was formed in 14% yield at 120° C. (+4.5 h). With prolonged reaction times, chlorosilane 7 was reduced almost quantitatively. With prolonged reaction times at 120° C., the amount of 9 decreased (60%) due to excess LiH, that supported formation of hydridochlorosilanes 8 (32%) and hydridosilane 10 (5%).

Example 4

The reaction was performed in analogy to the reaction of Example 3, but using diglyme as solvent and 2.7 mmol LiH. Table 5 covers the results of running the reaction as described, showing comparable trends and giving similar results as obtained in Example 3. Notably, already with short reaction time, overall hydrogenation is about 90%. The equilibrium between silanes 8 and 9 was shifted with prolonged reaction times, implying targeted product formation by simply controlling the reaction conditions.

TABLE 5

| no. | silane | 80° C./0.25 h + 120° C./2 h | 120° C., +2.5 h | 120° C., +6 h | 120° C., +60 h |
|---|---|---|---|---|---|
| 7 | MeSiCl$_3$ | 9 | 5 | 3 | 2 |
| 8 | MeSiH$_2$Cl | 23 | 28 | 37 | 41 |
| 9 | MeSiHCl$_2$ | 66 | 63 | 53 | 48 |
| 10 | MeSiH$_3$ | 2 | 3 | 7 | 9 |

Example 5

LiH (1.5 mmol), Me$_2$SiCl$_2$ (1.6 mmol), diglyme (0.4 ml) and a catalytic amount of n-Bu$_4$NCl (0.02 mmol) were placed in an NMR tube that was cooled to −196° C. (liquid nitrogen). After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 6

| no. | silane | 120° C., 22 h | 160° C., +40 h |
|---|---|---|---|
| 13 | Me$_2$SiH$_2$ | 7 | 10 |
| 11 | Me$_2$SiCl$_2$ | 42 | 41 |
| 12 | Me$_2$SiHCl | 52 | 49 |

After 22 h at 120° C. dimethyldichlorosilane was hydrogenated to give dimethylsilane 13 that subsequently redistributed with dimethyldichlorosilane 11 to give Me$_2$SiHCl (12) in 52% yield. Increasing the reaction temperature and time led to further hydrogenation of chlorosilanes but did not change the product distribution significantly (Table 6).

Example 6

The reaction was performed in an analogous manner to the reaction of Example 5 except for using PPh$_3$ (0.02 mmol) as a redistribution catalyst.

TABLE 7

| no. | silane | 120° C., 13 h | 160° C., +22 h | 160° C., +40 h |
|---|---|---|---|---|
| 13 | Me$_2$SiH$_2$ | 32 | 14 | 11 |
| 11 | Me$_2$SiCl$_2$ | 66 | 47 | 33 |
| 12 | Me$_2$SiHCl | 2 | 39 | 56 |

As can be seen from Table 7, the formation of Me$_2$SiHCl (12) was steadily increasing with increasing reaction temperature and time. The maximum amount of chlorosilane 12 essentially formed by redistribution of hydridosilane 13 with dichlorosilane 11 was 56% after 62 h at 160° C.

Example 7

The reaction was performed in analogy to the reaction of Example 5, except for using n-Bu$_3$P (0.02 mmol) as redistribution catalyst.

TABLE 8

| no. | silane | 120° C., 13 h | 160° C., +22 h | 160° C., +40 h |
|---|---|---|---|---|
| 13 | Me$_2$SiH$_2$ | 34 | 25 | 16 |
| 11 | Me$_2$SiCl$_2$ | 64 | 48 | 30 |
| 12 | Me$_2$SiHCl | 2 | 27 | 54 |

Similar to Example 6, the maximum amount of chlorosilane 12 formed by redistribution was 54% after 62 h at 160° C. (Table 8).

Example 8

The reaction was performed in an analogous manner to the reaction of Example 5 except for using 2-methylimidazole (0.02 mmol) as redistribution catalyst.

TABLE 9

| no. | silane | 120° C., 13 h | 160° C., +22 h | 200° C., +40 h |
|---|---|---|---|---|
| 13 | Me$_2$SiH$_2$ | 34 | 39 | 21 |
| 11 | Me$_2$SiCl$_2$ | 65 | 57 | 24 |
| 12 | Me$_2$SiHCl | 1 | 4 | 52 |
|  | not ident. | — | — | 3 |

In contrast to Example 6 and 7, Me$_2$SiHCl (12) was formed only in a molar amount of 4% after 22 h/160° C. Increasing the reaction temperature and time to 200° C./40 h finally gave 12 in 52% yield (Table 9).

Example 9

Me$_2$SiCl$_2$ (0.8 mmol), Me$_2$ClSi—SiClMe$_2$ (0.8 mmol), LiH (2.5 mmol), diglyme (0.4 ml) and catalytic amounts of n-Bu$_4$PCl (0.04 mmol) were placed in an NMR tube cooled to −196° C. (liquid nitrogen). After evacuation the NMR tube was sealed, warmed and the reaction course was investigated NMR spectroscopically.

TABLE 10

| no. | silane | 120° C., 13 h | 120° C., +22 h |
|---|---|---|---|
| 13 | Me$_2$SiH$_2$ | 17 | 35 |
| 11 | Me$_2$SiCl$_2$ | 9 | 6 |
| 12 | Me$_2$SiHCl | 44 | 42 |
| 3 | (Me$_2$ClSi)$_2$ | 9 | 1 |
| 18 | (Me$_2$HSi)$_2$ | 4 | 6 |
| 21 | Me$_2$ClSi—SiHMe$_2$ | 17 | 5 |
|  | trisilanes | — | 5 |

At 120° C./13 h Me$_2$ClSi—SiClMe$_2$ was cleaved as well as partially and fully hydrogenated to give compound 18 in 4% and compound 21 in 17% yield. Targeted product Me$_2$SiHCl (12) was formed in 44% besides Me$_2$SiH$_2$ (13) in 17% yield. Prolonged reaction times (+22 h) led to further hydrogenation by LiH to give hydridosilane 13 in a molar amount of 35%, while targeted product 12 was reduced to 42%. The amount of disilanes 3 and 21 decreased to 1% and 5% yield, respectively, while the molar amount of the fully hydrogenated disilane 18 increased slightly (6%). Trisilanes were formed in 5% (Table 10).

Example 10

MeCl$_2$Si—SiCl$_2$Me (0.6 mmol), MeSiCl$_3$ (0.6 mmol), LiH (1.5 mmol), diglyme (0.4 ml) and PPh$_3$ (0.05 mmol) as redistribution catalyst were placed in an NMR tube cooled to −196° C. (liquid nitrogen). After evacuation the NMR tube was sealed, warmed and the reaction course was investigated NMR spectroscopically.

TABLE 11

| no. | silane | 160° C., 16 h | 220° C., +15 h |
|---|---|---|---|
| 7 | MeSiCl$_3$ | 42 | 29 |
| 8 | MeSiH$_2$Cl | 8 | 11 |
| 9 | MeSiHCl$_2$ | 50 | 56 |
|  | not ident. | — | 4 |

After 16 h at 160° C. the starting disilane MeCl$_2$Si—SiCl$_2$Me (1) was quantitatively cleaved and via redistribution reactions the targeted products MeSiHCl$_2$ (8) and MeSiH$_2$Cl (9) were formed in 50% and 8% yield, respectively. With prolonged reaction times (+15 h) at 220° C. the molar amounts of compounds 8 and 9 were further increased to 56% and 11%, while not identified products were formed in a molar amount of 4% (Table 11).

Example 11

0.6 mmol of a complex mixture of chlorocarbodisilanes (carbodisilane distribution is listed in Table 12), Me$_2$SiCl$_2$ (0.8 mmol), LiH (1.6 mmol), n-Bu$_3$P (0.05 mmol) and diglyme (0.3 ml) were placed in a cooled NMR tube (−196° C.). After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 12

| no. | silane | educt (%) |
|---|---|---|
| 30 | (Cl$_2$MeSi)$_2$—CH$_2$ | 45 |
| 31 | ClMe$_2$Si—CH$_2$—SiMeCl$_2$ | 31 |
| 32 | (Me$_2$ClSi)$_2$—CH$_2$ | 14 |
| 34 | Me$_3$Si—CH$_2$—SiMe$_2$Cl | 10 |

TABLE 13

| no. | silane | 160° C., 16 h | 220° C., +15 h |
|---|---|---|---|
| 13 | Me$_2$SiH$_2$ | 34 | 5 |
| 11 | Me$_2$SiCl$_2$ | 36 | 25 |
| 12 | Me$_2$SiHCl | 8 | 34 |
| 9 | MeSiH$_2$Cl | — | 7 |
| 8 | MeSiHCl$_2$ | — | 7 |
| 10 | MeSiH$_3$ | 2 | 9 |
|  | carbodisilanes | 20 | 13 |

After 16 h at 160° C. the targeted product Me$_2$SiHCl (12) as well as dimethylsilane were formed in 8% and 34% yield, respectively. Hydrogenation and cleavage of chlorocarbodisilanes gave methylsilane 10 in 2% yield. With prolonged reaction times (+15 h) at 220° C. the molar amount of 12 increased to 34%, while that of Me$_2$SiH$_2$ (13) decreased (5%) due to redistribution reactions with chlorosilanes. Carbodisilanes were further cleaved (13% remained) to give silanes 8, 9 and 10 in 7%, 7% and 9% yield, respectively (Table 13).

Example 12

MeSiCl$_3$ (1.7 mmol) and tetraglyme (0.35 ml) were placed in an NMR tube, cooled to −196° C. (liquid nitrogen), then LiH (2.5 mmol) was added; the NMR tube was evacuated, sealed and warmed to r.t. The starting materials reacted upon heating the sample, and the course of the chlorosilane reduction/redistribution reaction was monitored by NMR spectroscopy. As listed in Table 14, the target compounds MeSiHCl$_2$ (8, 11%) and MeSiH$_2$Cl (9, 28%) were formed at 160° C., but required longer reaction times.

TABLE 14

| no. | silane | 60° C., 2 min | 100° C., +19 h | 120° C., +40 h | 160° C., +40 h |
|---|---|---|---|---|---|
| 7 | MeSiCl$_3$ | 75 | 60 | 54 | 36 |
| 9 | MeSiH$_2$Cl | 2 | 6 | 10 | 28 |
| 8 | MeSiHCl$_2$ | 1 | 4 | 5 | 11 |
| 10 | MeSiH$_3$ | 22 | 30 | 31 | 25 |

Example 13

Example for the Subsequent Treatment of Perhydrated by-Products, Such as Me$_2$SiH$_2$, by Chlorination with HCl in Ether Solvents Upon warming Me$_2$SiH$_2$ to r.t. it was evaporated into a 1 L flask filled with the HCl/diglyme reagent (170 g, 4.7 mol of HCl in 540 ml diglyme) that was cooled to −45° C. After completion (1.5 h) the reaction mixture was stirred for 4 h and then allowed to warm to 15° C. over a period of 8 hours. The HCl/diglyme flask was connected with a cooling trap (−78° C.) and after the overall reaction time of 12 hours a mixture of 16.85 g (0.28 mol) Me$_2$SiH$_2$, 0.83 g (9 mmol) Me$_2$SiHCl and 0.13 g (3 mmol) of methyl chloride were collected. Volatile compounds of the HCl/diglyme solution were condensed under vacuum in a cooling trap (about −196° C.) that was connected to another trap cooled to about −78° C. The condensed mixture (about −196° C.) was allowed to warm to r.t. at normal pressure (about 1013 mbar) separating dimethylchlorosilane formed from gaseous hydrogen chloride: Me$_2$SiHCl was collected in the −78° C. cooling trap while excess HCl was directly recycled by evaporation into a 1 L flask filled with diglyme used for the chlorination reaction at the beginning. The Me$_2$SiHCl collected in the −78° C. trap was condensed into an ampoule with Young-valve to give 59 g (0.62 mol) of Me$_2$SiHCl besides traces of methyl chloride and Me$_2$SiCl$_2$, obviously formed by double chlorination of Me$_2$SiH$_2$.

Me$_2$SiH$_2$, collected in the −78° C. cooling trap after chlorination reaction (16.85 g, see above), was additionally evaporated into the (recycled) HCl/diglyme mixture and reacted and worked up as described before, giving 25 g (0.27 mol) Me$_2$SiHCl, contaminated with traces of methyl chloride. Combining both Me$_2$SiHCl fractions and final distillation over a 50 cm Vigreux column at normal pressure gave 74 g (0.89 mol) of Me$_2$SiHCl (b.p.: 35° C.), in a yield of 99% for the chlorination step.

Example 14

A mixture of 112 mg highly chlorinated disilanes 69 mol % Cl$_2$MeSi—SiMeCl$_2$, 26 mol % ClMe$_2$Si—SiMeCl$_2$, 4 mol % ClMe$_2$Si—SiMe$_2$Cl and 1 mol % Me$_3$Si—SiMeCl$_2$ were reacted with 8.1 mg LiH (50 mol %, in relation to chlorine content in the mixture) in diglyme as solvent.

Reduction, redistribution and cleavage of chloro-mono- and disilanes started at r.t. as indicated by warming up of the reaction mixture. The products formed are listed in Table 15. The cleavage of disilanes was nearly quantitative, only highly methylated disilane $ClMe_2Si$—$SiMe_2Cl$ remained in traces (~1%). Monosilane $MeSiH_2Cl$ is the main product followed by monosilane 8.

TABLE 15

| no. | silane | mol % |
|---|---|---|
| 8 | $MeSiHCl_2$ | 21 |
| 12 | $Me_2SiHCl$ | 9 |
| 9 | $MeSiH_2Cl$ | 33 |
| 11 | $Me_2SiCl_2$ | 19 |
| 14 | $Me_3SiCl$ | 2 |
| 7 | $MeSiCl_3$ | 2 |
| 10 | $MeSiH_3$ | 13 |
| 3 | $ClMe_2Si$—$SiMe_2Cl$ | 1 |

Example 15

Reaction of the methylchlorodisilane mixture (183 mg) of the sample from Example 14 with LiH in diglyme can easily be controlled by the amount of LiH reacted. Reduction of LiH to 41 mol % (10 mg, in relation to chlorine content in the mixture (when compared to Example 14) avoids formation of the low boiling monosilane $MeSiH_3$, instead dichlorsilanes $MeSiHCl_2$ and $Me_2SiCl_2$ became the main products. The overall product composition is listed in Table 16, about 2 mol % disilanes remained unreacted. The reaction occurred at r.t. under self-heating of the sample to about 40° C.

TABLE 16

| no. | silane | mol % |
|---|---|---|
| 8 | $MeSiHCl_2$ | 37 |
| 12 | $Me_2SiHCl$ | 7 |
| 9 | $MeSiH_2Cl$ | 6 |
| 11 | $Me_2SiCl_2$ | 34 |
| 14 | $Me_3SiCl$ | 2 |
| 7 | $MeSiCl_3$ | 11 |
| 1 | $Cl_2MeSi$—$SiMeCl_2$ | 0.5 |
| 3 | $ClMe_2Si$—$SiMe_2Cl$ | 1.5 |

Example 16

The results of Example 15 are further investigated by treating the mixture of disilanes (110 mg-159 mg) of Example 14 with different molar amounts of LiH (25 mol-%, 50 mol-%, 75 mol-%, 100 mol-% and 400 mol-%, in relation to chlorine content in the mixture) in diglyme. All reactions occurred at r.t. with self-heating of the samples. The products formed are listed in Table 17 and demonstrate that after cleavage of the silicon-silicon bonds the resulting chlorinated monosilanes are further transformed into hydrogen-substituted monosilanes by LiH.

The higher the chloro substitution at Si is, the faster hydrogenation occurs: $MeSiCl_3$>$Me_2SiCl_2$>$Me_3SiCl$. The same is true for the only partially hydrated monosilanes $MeH_2SiCl$>$MeSiHCl_2$>$Me_2SiHCl$. Especially the latter reacts very slowly because the molar amount of this chlorosilane remains nearly constant in all reactions performed. With high excess of LiH (about 400 mol %) all chloro substituted monosilanes are completely reacted to the per hydrogenated silanes $Me_2SiH_2$ (6%) $MeSiH_3$ (78%) and the per hydrogenated disilanes
$H_2MeSi$-$SiMeH_2$, $HMe_2Si$—$SiMeH_2$,
$HMe_2Si$—$SiMe_2H$ and $Me_3Si$—$SiMeH_2$.

The results of this series of experiments are listed in the Table 17. In summary, for the synthesis of monohydrated silanes such as $MeSiHCl_2$ and $Me_2SiHCl$, LiH should be used in stoichiometric deficit (<about 25 mol %), for an increase of the amount of monosilane $MeSiH_2Cl$ the molar amount of LiH is best about 25 mol-% to about 75 mol %. For a complete formation of perhydrido-methylsilanes (Me-$SiH_3$ and $Me_2SiH_2$) LiH should be used in excess, but this is not desirable according to the present invention.

TABLE 17

| | | LiH conc. [ mol %] | | | | |
|---|---|---|---|---|---|---|
| no. | silane | 25 mol % | 50 mol % | 75 mol % | 100 mol % | 400 mol % |
| 8 | $MeSiHCl_2$ | 30 | 21 | 6 | 2 | — |
| 12 | $Me_2SiHCl$ | 11 | 13 | 12 | 12 | — |
| 9 | $MeSiH_2Cl$ | 18 | 35 | 30 | 24 | — |
| 13 | $Me_2SiH_2$ | — | — | 2 | 3 | 6 |
| 10 | $MeSiH_3$ | 7 | 13 | 41 | 56 | 78 |
| 11 | $Me_2SiCl_2$ | 21 | 15 | 7 | 2 | — |
| 14 | $Me_3SiCl$ | 2 | 2 | 1 | traces | — |
| 3 | $ClMe_2Si$—$SiMe_2Cl$ | 1 | 1 | 1 | 1 | — |
| 16 | $H_2MeSi$—$SiMeH_2$ | — | — | — | traces | 8 |
| 17 | $H_2MeSi$—$SiMe_2H$ | — | — | — | — | 5 |
| 19 | $Me_3Si$—$SiMeH_2$ | — | — | — | — | 2 |
| 18 | $HMe_2Si$—$SiMe_2H$ | — | — | — | — | 1 |

Example 17

The reaction of a complex mixture (131-238 mg) of mainly highly chlorinated disilanes and monosilanes as displayed in Table 18 was reacted with 41 mol % or 73 mol % LiH (in relation to chlorine content in the mixture), respectively, in diglyme at r.t. with self-heating. The products formed are listed in Table 19 and show that monosilanes are formed in a molar amount of 96%, and 4 mol % of tetramethyldichloro- and pentamethylchlorodisilane remained unreacted. Higher amounts of LiH lead to increasing amounts of hydrogen substituted silanes by Si—Cl→Si—H reduction.

TABLE 18

| no. | silane | mol % |
|---|---|---|
| 11 | $Me_2SiCl_2$ | 7.9 |
| 5 | $Me_3Si$—$SiMe_2Cl$ | 2.0 |
| 3 | $ClMe_2Si$—$SiMe_2Cl$ | 3.5 |
| 1 | $Cl_2MeSi$—$SiMeCl_2$ | 49.5 |
| 2 | $ClMe_2Si$—$SiMeCl_2$ | 33.7 |
| 4 | $Me_3Si$—$SiMeCl_2$ | 3.0 |
| 6 | $Me_3Si$—$SiMe_3$ | 0.4 |

TABLE 19

| | | LiH conc. [mol %] | |
|---|---|---|---|
| no. | silane | 41 mol % | 73 mol % |
| 8 | $MeSiHCl_2$ | 17 | 11 |
| 12 | $Me_2SiHCl$ | 14 | 21 |

TABLE 19-continued

| | | LiH conc. [mol %] | |
|---|---|---|---|
| no. | silane | 41 mol % | 73 mol % |
| 9 | MeSiH$_2$Cl | 20 | 26 |
| 13 | Me$_2$SiH$_2$ | — | 2 |
| 10 | MeSiH$_3$ | 6 | 16 |
| 11 | Me$_2$SiCl$_2$ | 35 | 16 |
| 14 | Me$_3$SiCl | 4 | 4 |
| 3 | ClMe$_2$Si—SiMe$_2$Cl | 2 | 2 |
| 5 | Me$_3$Si—SiMe$_2$Cl | 2 | 2 |
| 6 | Me$_3$Si—SiMe$_3$ | traces | traces |

Example 18

For hydrogenation of methylchlorodisilanes tributyltin hydride was used as reducing agent. For the preparation of n-Bu$_3$SnH see: U. Herzog, G. Roewer and U. Pitzold, Katalytische Hydrierung chlorhaltiger Disilane mit Tributylstannan, J. Organomet. Chem 1995, 494, 143-147.

Disilane (ClMe$_2$Si—SiMe$_2$Cl, admixed with 5 mol % Me$_3$Si—SiMe$_2$Cl) (4.04 g) was reacted in a 1/1 molar ratio with the tin hydride in diglyme and tetraphenylphosphoniumchloride (Ph$_4$PCl, 3 w %) as catalyst at r.t. After work up, a mixture of the disilanes ClMe$_2$Si—SiMe$_2$Cl (15 mol %), Me$_3$Si—SiMe$_2$Cl (4 mol %), ClMe$_2$Si—SiMe$_2$H (72 mol %) and Me$_3$Si—SiMe$_2$H (9 mol %) was obtained. 200 mg of those disilanes were subsequently reacted with tetrabutylphosphoniumchloride (n-Bu$_4$PCl, 25 w %) in a sealed NMR tube at 180° C. for 9 h. As listed in Table 20, the hydrido disilane ClMe$_2$Si—SiMe$_2$H was nearly completely cleaved into the monosilanes Me$_2$SiHCl and Me$_2$SiH$_2$ that were formed in 68 mol % yield. Chlorosilane Me$_3$SiCl results from cleavage of the disilane Me$_3$Si—SiMe$_2$Cl. Unidentified oligosilanes were detected in small amounts.

TABLE 20

| no. | silane | mol % |
|---|---|---|
| 12 | Me$_2$SiHCl | 37 |
| 13 | Me$_2$SiH$_2$ | 31 |
| 14 | Me$_3$SiCl | 14 |
| 11 | Me$_2$SiCl$_2$ | 8 |
| 15 | Me$_3$SiH | 1 |
| | educts, oligosilanes | 9 |

The mixture of disilanes ClMe$_2$Si—SiMe$_2$Cl (15 mol %), Me$_3$Si—SiMe$_2$Cl (4 mol %), ClMe$_2$Si—SiMe$_2$H (72 mol %) and Me$_3$Si—SiMe$_2$H (9 mol %) as obtained above from hydrogenation (200 mg) was reacted with 2-methylimidazole (2-MIA, 16 w %) in a sealed NMR tube at 220° C. for 9 h. The amount of chlorosilane Me$_2$SiHCl was smaller than in the reaction in the presence of tetrabutylphosphoniumchloride, the main product obtained was dimethylsilane Me$_2$SiH$_2$, followed by Me$_3$SiCl (13.2 mol %). Remaining disilanes Me$_3$Si—SiMe$_2$Cl and Me$_3$Si—SiMe$_2$H were 15.0 mol % respectively 8.2 mol %. Notably, perhydrogenated disilane HMe$_2$Si—SiMe$_2$H was detected in 1.0 mol % (Table 21).

Prolonged reaction times (69 h) lead to almost quantitative splitting of H-substituted disilanes as well as conversion of tri- and tetrasilanes (ClMe$_2$Si—SiMe$_2$-SiMe$_2$Cl and ClMe$_2$Si—SiMe$_2$-SiMe$_2$Cl), named in the table as "oligosilanes", into monomers. Products obtained are listed in Table 22 and prove formation of Me$_2$SiHCl (~40 mol %) as main component.

TABLE 21

| no. | silane | mol % |
|---|---|---|
| 12 | Me$_2$SiHCl | 17.1 |
| 13 | Me$_2$SiH$_2$ | 31.5 |
| 14 | Me$_3$SiCl | 13.2 |
| 11 | Me$_2$SiCl$_2$ | 8.8 |
| 21 | ClMe$_2$Si—SiMe$_2$H | 15.0 |
| 20 | Me$_3$Si—SiMe$_2$H | 8.2 |
| 18 | HMe$_2$Si—SiMe$_2$H | 1.0 |
| | oligosilanes | 5.2 |

TABLE 22

| no. | silane | mol % |
|---|---|---|
| 12 | Me$_2$SiHCl | 39.5 |
| 13 | Me$_2$SiH$_2$ | 34.0 |
| 14 | Me$_3$SiCl | 13.4 |
| 11 | Me$_2$SiCl$_2$ | 7.3 |
| 21 | ClMe$_2$Si—SiMe$_2$H | 5.8 |

Example 19

Hydrogenation Reaction

For simulation of a mono- and disilane fraction obtained from the Müller-Rochow-Direct Process, a mixture (1.10 g) of compounds listed in Table 24, (1.19 g) of monosilane Me$_2$SiCl$_2$ and highly chlorinated disilanes listed in Table 25 and (1.07 g) of compounds listed in Table 23 were mixed and reacted with different molar amounts of n-Bu$_3$SnH to replace 25, 50 and 75 mol % of all chlorine substituents at silicon. After reduction, the products were isolated by condensation/distillation to give the product mixtures IV, V and VI listed in Table 26.

TABLE 23

| no. | silane | mol % |
|---|---|---|
| 11 | Me$_2$SiCl$_2$ | 12.4 |
| 14 | Me$_3$SiCl | 2.2 |
| 7 | MeSiCl$_3$ | 11.5 |
| 5 | Me$_3$Si—SiMe$_2$Cl | 16.8 |
| 3 | ClMe$_2$Si—SiMe$_2$Cl | 22.6 |
| 1 | Cl$_2$MeSi—SiMeCl$_2$ | 16.2 |
| 2 | ClMe$_2$Si—SiMeCl$_2$ | 7.1 |
| 4 | Me$_3$Si—SiMeCl$_2$ | 2.7 |
| 6 | Me$_6$Si$_2$ | 2.4 |
| 34 | Me$_3$Si—CH$_2$—SiMe$_2$Cl | 3.1 |
| 30 | (Cl$_2$MeSi)$_2$—CH$_2$ | 0.4 |
| 31 | ClMe$_2$Si—CH$_2$—SiMeCl$_2$ | 0.9 |
| 33 | Me$_3$Si—CH$_2$—SiMeCl$_2$ | 0.4 |
| 35 | Me$_3$Si—CH$_2$—SiMe$_3$ | 1.3 |

TABLE 24

| no. | silane | mol % |
|---|---|---|
| 11 | Me$_2$SiCl$_2$ | 6.8 |
| 14 | Me$_3$SiCl | 7.1 |
| 7 | MeSiCl$_3$ | 12.5 |
| 12 | Me$_2$SiHCl | 4.3 |
| 8 | MeSiHCl$_2$ | 1.4 |
| 5 | Me$_3$Si—SiMe$_2$Cl | 3.9 |
| 3 | (ClMe$_2$Si)$_2$ | 17.9 |
| 1 | (Cl$_2$MeSi)$_2$ | 1.4 |
| 6 | Me$_6$Si$_2$ | 0.2 |
| 34 | Me$_3$Si—CH$_2$—SiMe$_2$Cl | 3.9 |
| 32 | (ClMe$_2$Si)$_2$—CH$_2$ | 5.2 |
| 30 | (Cl$_2$MeSi)$_2$—CH$_2$ | 14.7 |

TABLE 24-continued

| no. | silane | mol % |
|---|---|---|
| 31 | ClMe$_2$Si—CH$_2$—SiMeCl$_2$ | 11.4 |
| 33 | Me$_3$Si—CH$_2$—SiMeCl$_2$ | 1.8 |
| 35 | Me$_3$Si—CH$_2$—SiMe$_3$ | 7.5 |

TABLE 25

| no. | silane | mol % |
|---|---|---|
| 11 | Me$_2$SiCl$_2$ | 7.9 |
| 5 | Me$_3$Si—SiMe$_2$Cl | 2.0 |
| 3 | ClMe$_2$Si—SiMe$_2$Cl | 3.5 |
| 1 | Cl$_2$MeSi—SiMeCl$_2$ | 49.5 |
| 2 | ClMe$_2$Si—SiMeCl$_2$ | 33.7 |
| 4 | Me$_3$Si—SiMeCl$_2$ | 3.0 |
| 6 | Me$_3$Si—SiMe$_3$ | 0.4 |

TABLE 26

| no. | silane | sample IV mol % | sample V mol % | sample VI mol % |
|---|---|---|---|---|
| 3 | ClMe$_2$Si—SiMe$_2$Cl | 18 | 9 | 7 |
| 11 | Me$_2$SiCl$_2$ | 18 | 20 | 27 |
| 5 | Me$_5$Si$_2$Cl | 16 | 23 | 28 |
| 7 | MeSiCl$_3$ | 13 | 7 | 9 |
| 16 | H$_2$MeSi—SiMeH$_2$ | 9 | 18 | — |
| 2 | ClMe$_2$Si—SiMeCl$_2$ | 4 | — | — |
| 33 | Cl$_2$MeSi—CH$_2$—SiMe$_3$ | 4 | 2 | 3 |
| 9 | MeSiH$_2$Cl | 3 | — | — |
| 24 | H$_2$MeSi—SiMeCl$_2$ | 3 | 3 | 1 |
| 17 | HMe$_2$Si—SiMeH$_2$ | 3 | 2 | 1 |
| 6 | Me$_3$Si—SiMe$_3$ | 2 | 5 | 4 |
| 31 | ClMe$_2$Si—CH$_2$—SiMeCl$_2$ | 2 | 2 | 6 |
| 4 | Me$_3$Si—SiMeCl$_2$ | 1 | 2 | 4 |
| 18 | HMe$_2$Si—SiMe$_2$H | 1 | 1 | 2 |
| 30 | Cl$_2$MeSi—CH$_2$—SiMeCl$_2$ | 1 | 3 | 2 |
| 31 | ClMe$_2$Si—CH$_2$—SiMe$_2$Cl | 1 | 2 | 4 |
| 34 | ClMe$_2$Si—CH$_2$—SiMe$_3$ | 1 | 1 | 3 |

Redistribution and Cleavage Reaction

Redistribution and cleavage reactions with the mixture of sample IV of table 26 (280 mg) were performed with n-Bu$_4$PCl (6 w %) in a sealed NMR tube. NMR measurements were taken at r.t., 140° C. (+23 h) and 220° C. (+16 h). Cleavage reactions already started at r.t. and only traces of Me$_3$Si—SiMe$_3$ (~1 mol %) remained unreacted at 220° C. (Table 27).

TABLE 27

| no. | silane | r.t./1 h mol % | 140° C./+23 h mol % | 220° C./+16 h mol % |
|---|---|---|---|---|
| 3 | ClMe$_2$Si—SiMe$_2$Cl | 12.1 | — | — |
| 12 | Me$_2$SiHCl | 16.5 | 20.8 | 21.6 |
| 14 | Me$_3$SiCl | 1.1 | 5.0 | 11.3 |
| 11 | Me$_2$SiCl$_2$ | 10.1 | 37.5 | 40.2 |
| 7 | MeSiCl$_3$ | — | — | — |
| 8 | MeSiHCl$_2$ | 16.7 | 10.2 | 7.4 |
| 9 | MeSiH$_2$Cl | 14.4 | 11.1 | 11.3 |
| 13 | Me$_2$SiH$_2$ | — | — | 1.9 |
| 10 | MeSiH$_3$ | 8.8 | 5.6 | 2.7 |
| 6 | Me$_3$Si—SiMe$_3$ | 0.9 | 0.6 | 1.1 |
| 5 | Me$_3$Si—SiMe$_2$Cl | 7.5 | 2.8 | — |
|  | carbodisilanes | 11.9 | 6.4 | 2.5 |

In Table 28 the results of the comparable cleavage and redistribution reactions of samples V and VI are listed.

TABLE 28

| | | sample V | | | sample VI | | |
|---|---|---|---|---|---|---|---|
| no. | silane | r.t. 1 h mol % | 140° C. +23 h mol % | 220° C. +16 h mol % | r.t. 1 h mol % | 140° C. +23 h mol % | 220° C. +16 h mol % |
| 3 | ClMe$_2$Si—SiMe$_2$Cl | 13.1 | — | — | 18.1 | — | — |
| 12 | Me$_2$SiHCl | 18.6 | 36.4 | 29.7 | 14.3 | 29.5 | 27.3 |
| 14 | Me$_3$SiCl | 1.6 | 11.3 | 17.4 | 2.6 | 13.6 | 22.9 |
| 11 | Me$_2$SiCl$_2$ | 11.3 | 28.9 | 29.2 | 15.4 | 37.8 | 37.2 |
| 8 | MeSiHCl$_2$ | 6.2 | 1.5 | 2.0 | 1.1 | 0.8 | 1.2 |
| 9 | MeSiH$_2$Cl | 6.3 | 1.6 | 4.3 | 0.7 | — | 2.7 |
| 13 | Me$_2$SiH$_2$ | 1.1 | 2.5 | 7.2 | 2.5 | 1.5 | 2.3 |
| 10 | MeSiH$_3$ | 11.4 | 5.4 | 6.9 | 5.2 | 2.3 | 1.7 |
| 6 | Me$_3$Si—SiMe$_3$ | 1.3 | 2.0 | 1.2 | 2.0 | 2.6 | 1.3 |
| 5 | Me$_3$Si—SiMe$_2$Cl | 16.9 | 2.4 | — | 19.7 | 1.5 | — |
|  | carbodisilanes | 12.2 | 8.0 | 2.1 | 18.4 | 10.4 | 3.4 |

From reactions of samples IV-VI it is obvious that with increasing replacement of Cl against H in the methylchlorodisilanes MenSi$_2$Cl$_{6-n}$ with Cl≥3, the partial hydrido substituted disilanes were cleaved significantly faster. Cleavage of disilanes with Me≥4 (partial or perhydrogenated) required higher temperatures. At about 140° C. mainly the chlorosilanes Me$_2$SiCl$_2$, Me$_3$SiCl, Me$_2$SiHCl and MeSiHCl$_2$ were formed. Investigation of the reactions by $^{31}$P-NMR spectroscopy proved the activity of n-Bu$_4$PCl as real catalyst, only at 220° C. and higher, the latter is completely reacted to give n-Bu$_3$P, traces of n-Bu$_2$PH and 1-but-ene, and hydrogen chloride that is responsible for the final formation of H/Cl substituted monosilanes.

Example 20

In a 50 ml flask, a mixture of disilanes Cl$_2$MeSi—SiMeCl$_2$ (69 mol %), ClMe$_2$Si—SiMeCl$_2$ (26 mol %), ClMe$_2$Si—SiMe$_2$Cl (4 mol %) and Me$_3$Si—SiMeCl$_2$ (1 mol %) (244 mg) was reacted with Ph$_4$PCl (25.3 mg) and LiH (202 mg) in 0.5 mL of diglyme. Already at r.t. 75 mol % of monosilanes were formed, with compound 8 obtained in an amount of 40 mol %. 25 mol % of disilanes remained uncleaved, 10 mol % of those were reduced (SiCl—SiH) (Table 29). MeSiH$_3$ that might have been formed evaporated in the open system due to its low boiling point (−57° C.). That is why the same disilane mixture (122 mg) was reacted with the catalyst/LiH (1 w %/4 w %) in a sealed NMR tube at r.t. In this case monosilane 10 was detected in 13 mol % yield, the compound 8 was formed in 21 mol % and compound 9 in 33 mol % yield.

TABLE 29

| no. | silane | mol % |
|---|---|---|
| 8 | MeSiHCl$_2$ | 40 |
| 12 | Me$_2$SiHCl | 9 |
| 9 | MeSiH$_2$Cl | 10 |
| 11 | Me$_2$SiCl$_2$ | 10 |
| 14 | Me$_3$SiCl | 2 |
| 7 | MeSiCl$_3$ | 4 |
| 1 | Cl$_2$MeSi—SiMeCl$_2$ | 4 |
| 3 | ClMe$_2$Si—SiMe$_2$Cl | 1 |
| 2 | ClMe$_2$Si—SiMeCl$_2$ | 9 |
| 4 | Me$_3$Si—SiMeCl$_2$ | 1 |
| 24 | MeH$_2$Si—SiMeCl$_2$ | 2 |
| 25 | MeH$_2$Si—SiMeHCl | 6 |
| 17 | HMe$_2$Si—SiMeH$_2$ | 1 |
| 16 | MeH$_2$Si—SiMeH$_2$ | 1 |

Example 21

This Example 21 illustrates the desirable changes in composition of the product from the Rochow-Müller Direct Synthesis brought about by treating the crude methylchlorosilane mixture with LiH. Consider that the Rochow-Müller Direct Synthesis is occurring at 290° C./4 atm in a commercial-scale fluidized-bed reactor containing about 45 metric tons copper-activated silicon. Silicon conversion is 4.5%/h, which yields about 9300 kg/h methylchlorosilane crude. All, or a portion, of this crude is treated with LiH to increase formation of methylchlorohydridosilanes, particularly Me$_2$SiHCl.

Table 30 lists compositions of two samples of the crude methylchlorosilanes, as well as the quantities (in grams per metric ton) of each component. Molar amounts per metric ton and the total moles of chloride are shown in Table 31. These data enable calculation of the molar and gravimetric amounts of LiH required to produce desired quantities of methylchlorohydridosilanes.

TABLE 30

Gravimetric Composition of Products from Rochow - Müller Direct Synthesis

| COMPOUND | SAMPLE A wt % | SAMPLE A g/MT | SAMPLE B wt % | SAMPLE B g/MT |
|---|---|---|---|---|
| (CH$_3$)$_4$Si | Trace | | Trace | |
| HSiCl$_3$ | Trace | | Trace | |
| (CH$_3$)$_2$SiHCl (M2H) | 0.09 | 901.35 | 1.10 | 11024.2 |
| CH$_3$SiHCl$_2$ (MH) | 1.34 | 13420.1 | 4.69 | 46902.96 |

TABLE 30-continued

Gravimetric Composition of Products from Rochow - Müller Direct Synthesis

| COMPOUND | SAMPLE A wt % | SAMPLE A g/MT | SAMPLE B wt % | SAMPLE B g/MT |
|---|---|---|---|---|
| (CH$_3$)$_3$SiCl (M) | 1.76 | 17626.4 | 2.05 | 20545.1 |
| CH$_3$SiCl$_3$ (T) | 3.96 | 39559.25 | 5.17 | 51713.52 |
| (CH$_3$)$_2$SiCl$_2$ (D) | 90.19 | 901850.75 | 82.87 | 828719.18 |
| (CH$_3$)$_3$SiSi(CH$_3$)$_3$ | 0.01 | 90.16 | 0.01 | 123.71 |
| (CH$_3$)$_3$SiSi(CH$_3$)$_2$Cl | 0.05 | 452.04 | 0.06 | 620.28 |
| Cl(CH$_3$)$_2$SiSi(CH$_3$)$_2$Cl | 0.09 | 876.33 | 0.12 | 1202.49 |
| (CH$_3$)$_3$SiSi(CH$_3$)Cl$_2$ | 0.07 | 737.97 | 0.10 | 1012.62 |
| Cl(CH$_3$)$_2$SiSi(CH$_3$)Cl$_2$ | 0.94 | 9386.70 | 1.29 | 12880.25 |
| Cl$_2$(CH$_3$)SiSi(CH$_3$)Cl$_2$ | 1.51 | 15056.80 | 2.07 | 20660.65 |
| T/D | 0.044 | | 0.062 | |

MT = Metric ton (1000 kg)

Here, it is useful to recall that methylchlorodisilanes are reduced and cleaved by LiH that the order of reactivity of the methylchlorosilanes with LiH is CH$_3$SiCl$_3$>(CH$_3$)$_2$SiCl$_2$>(CH$_3$)$_3$SiCl and CH$_3$SiH$_2$Cl>CH$_3$SiHCl$_2$>CH$_3$SiCl$_3$ and (CH$_3$)$_2$SiHCl>(CH$_3$)$_2$SiCl$_2$

TABLE 31

Molar Composition of Products from Rochow - Müller Direct Synthesis

| COMPOUND | SAMPLE A, mol/MT | SAMPLE B, mol/MT |
|---|---|---|
| (CH$_3$)$_2$SiHCl (M2H) | 9.53 | 116.51 |
| CH$_3$SiHCl$_2$ (MH) | 116.67 | 407.75 |
| (CH$_3$)$_3$SiCl (M) | 162.25 | 189.11 |
| CH$_3$SiCl$_3$ (T) | 264.65 | 345.96 |
| (CH$_3$)$_2$SiCl$_2$ (D) | 6987.84 | 6421.19 |
| (CH$_3$)$_3$SiSi(CH$_3$)$_3$ | 0.62 | 0.85 |
| (CH$_3$)$_3$SiSi(CH$_3$)$_2$Cl | 2.71 | 3.72 |
| Cl(CH$_3$)$_2$SiSi(CH$_3$)$_2$Cl | 4.68 | 6.42 |
| (CH$_3$)$_3$SiSi(CH$_3$)Cl$_2$ | 3.94 | 5.41 |
| Cl(CH$_3$)$_2$SiSi(CH$_3$)Cl$_2$ | 45.21 | 62.04 |
| Cl$_2$(CH$_3$)SiSi(CH$_3$)Cl$_2$ | 66.03 | 90.61 |
| TOTAL CHLORIDE, mol/MT | 15351.56 | 14645.26 |
| LiH (g) for 55 mol % Use | 67125 | 64036 |
| LiH (g) for 110 mol % Use | 134249 | 128073 |

The remaining calculations are based on the use of 67 kg LiH (value from Table 31, row 14) to treat 1 metric ton of MCS crude having the compositions shown in Table 30.

TABLE 32

Reduction of Methylchlorosilanes by LiH

| SILANE | LiH, mol % | PRODUCTS FORMED. DATA IN mol % | | | |
|---|---|---|---|---|---|
| | | $(CH_3)_3SiCl$ | $(CH_3)_3SiH$ | | |
| $(CH_3)_3SiCl$ | 55 | 50 | 50 | | |
| | 110 | 0 | 100 | | |
| | | $(CH_3)_2SiCl_2$ | $(CH_3)_2SiHCl$ | $(CH_3)_2SiH_2$ | |
| $(CH_3)_2SiCl_2$ | 55 | 48 | 4 | 48 | |
| | 110 | 0 | 0 | 100 | |
| | | $CH_3SiCl_3$ | $CH_3SiHCl_2$ | $CH_3SiH_2Cl$ | $CH_3SiH_3$ |
| $CH_3SiCl_3$ | 55 | 49 | 1 | 2 | 48 |
| | 110 | 0 | 0 | 0 | 100 |

$^{29}$Si NMR spectroscopy was used to obtain the data disclosed in Tables 32 on the reaction of individual methylchlorosilanes with LiH. LiH cleavage of the individual methylchlorodisilanes was also studied by $^{29}$Si NMR spectroscopy. The data are displayed in Table 33.

TABLE 33

Cleavage of individual methylchlorodisilanes by LiH

| DISILANE | REACTION WITH LiH, % | PRODUCTS FORMED. DATA IN mol % | | |
|---|---|---|---|---|
| | | $(CH_3)_3SiX$ | $(CH_3)_2SiX_2$ | $CH_3S1X_3$ |
| $(CH_3)_3SiSi(CH_3)_2Cl$ | 5* | 95 | 5 | |
| $Cl(CH_3)_2SiSi(CH_3)_2Cl$ | 10* | 5 | 95 | |
| $(CH_3)_3SiSi(CH_3)Cl_2$ | 75 | 90 | | 10 |
| $Cl(CH_3)_2SiSi(CH_3)Cl_2$ | 75 | | 90 | 10 |
| $Cl_2(CH_3)SiSi(CH_3)Cl_2$ | 80 | | 1 | 99 |

*Highly methylated disilanes react only to a limited extent with LiH. X = Cl, H.

The data in Tables 32 and 33 are used in conjunction with the results of other redistribution experiments in co-pending applications to arrive at the final compositions shown in Table 34

TABLE 34

Final Product Compositions After Reduction, Cleavage and Redistribution

| | SAMPLE A | | SAMPLE B | |
|---|---|---|---|---|
| COMPOUND | wt % | g/MT | wt % | g/MT |
| $CH_2SiH_3$ | 0.01 | 103.56 | 0.03 | 195.07 |
| $(CH_3)_2SiH_2$ | 8.69 | 64147.05 | 7.87 | 55750.15 |
| $CH_3SiH_2Cl$ | 3.36 | 24805.64 | 4.60 | 32537.87 |
| $(CH_3)_3SiH$ | 0.00 | 0 | 0.00 | 0 |
| $(CH_3)_2SiHCl$ (M2H) | 61.79 | 456374.71 | 60.75 | 430182.72 |
| $CH_3SiHCl_2$ (MH) | 0.10 | 737.63 | 0.17 | 1215.78 |
| $(CH_3)_3SiCl$ (M) | 6.30 | 46549.75 | 8.51 | 60233.16 |
| $CH_3SiCl_3$ (T) | 0.00 | 0 | 0.00 | 0 |
| $(CH_3)_2SiCl_2$ (D) | 19.75 | 145838.12 | 18.07 | 127955.50 |
| T/D | 0 | | 0 | |
| TOTAL MCS WEIGHT, g | | 738556.45 | | 708070.24 |
| TOTAL LiCl PRODUCED, g | | 325407 | | 310436 |

The results of these Examples demonstrate that the use of only 6.7 weight percent LiH can alter the composition of the product from the Rochow-Müller Direct Synthesis from being primarily dimethyldichlorosilane (D) to primarily dimethylchlorosilane (M2H).

Methyltrichlorosilane (T) is consumed and trimethylchlorosilane (M) is increased. The product yield is approximately 71-74%. Volatile hydridosilanes ($CH_3SiH_3$, $(CH_3)_2SiH_2$ and $CH_3SiH_2Cl$) can be recovered and added to fresh Rochow-Müller Direct Synthesis product, or reused in redistribution with methylchlorosilanes. Overall, more valuable monomers are obtained. Additionally, LiCl (>300 kg) produced can be recovered and used to produce Li and LiH.

Example 22

On the Recovery of LiCl for Manufacture of Li and LiH

This Example illustrates the recovery, purification and characterization of LiCl produced when LiH was used in the reduction of $(CH_3)_2SiCl_2$ to $(CH_3)_2SiHCl$ and $(CH_3)_2SiH_2$ as is described in co-pending applications.

Solid from the reaction was recovered by filtration and treated with diglyme saturated with gaseous HCl to convert any unreacted LiH to LiCl. It was then washed four times with dry pentane and dried in vacuo at 630° C. for one hour.

The LiCl was dissolved in diglyme and $C_6D_6$ characterized by $^7$Li-NMR recorded on a Bruker AV-500 spectrometer.

The single resonance observed (δ=0.23 ppm) is assignable to the chemical shift of LiCl by comparison with an authentic sample of LiCl (δ=0.20 ppm).

The dried LiCl was mixed with KCl in the proportions shown in the Table below. Melting behavior of the samples was recorded by a camera attached to the automated melting point apparatus, OptiMelt MPA 100. For comparison, the melting behavior of authentic LiCl—KCl samples was also measured. Both sets of data are shown in the Table 35.

TABLE 35

| WEIGHT RATIOS, LiCLKCl | MELTING POINTS, °C. RECOVERED LiCLKCl | MELTING POINTS, °C. AUTHENTIC LiCLKCl |
|---|---|---|
| 40:60 | 355.3 | 354.8 |
| 50:50 | 356.1 | 355.6 |
| 60:40 | 355.9 | 356.6 |

The observed melting points for the recovered and control samples are in good agreement with each other. The 40:60 LiCl—KCl sample corresponds to the eutectic composition. The melting point observed is consistent with published values (see S. Zemczuzny, et al., *Zeitschrift für Anorganische Chemie*, 46 (1910) 403-428). The melting point data prove that the recovered LiCl forms a pure eutectic with KCl and thereby satisfies one of the quality criteria for electrolytic Li recovery.

Example 23

To prove the assumption of Example 21 and to elucidate optimum reaction conditions for the formation of $Me_2SiHCl$ in high yields, the complex crude mixture of the Rochow-Müller Direct Process was simulated by admixing the single compounds in a molar ratio listed in Table 36, with $Me_2SiCl_2$ as the main component (91.65 mol %), $MeSiCl_3$ being present in 4.85 mol %.

TABLE 36

| Compound | M [g/mol] | $^{29}$Si-NMR integrals | Mol % | M of the mixture [g/mol] | Chlorine in mixture | Density [g/ml] | Density of the mixture [g/ml] |
|---|---|---|---|---|---|---|---|
| $Me_2SiCl_2$ | 129.06 | 1 | 91.646 | 118.28 | 1.832928 | 1.064 | 0.97511 |
| $Me_3SiCl$ | 108.64 | 0.0216 | 1.980 | 2.15 | 0.019795 | 0.856 | 0.01694 |
| $MeSiCl_3$ | 149.48 | 0.0529 | 4.848 | 7.25 | 0.145442 | 1.273 | 0.06171 |
| $Me_5Si_2Cl$ | 166.8 | 0.0003 | 0.027 | 0.05 | 0.000274 | 0.862 | 0.00023 |
| $(ClMe_2Si)_2$ | 187.21 | 0.0003 | 0.027 | 0.05 | 0.000549 | 1.006 | 0.00027 |
| $(Cl_2MeSi)_2$ | 228.04 | 0.01025 | 0.939 | 2.14 | 0.037575 | 1.269 | 0.01192 |
| $ClMe_2Si$—$SiMeCl_2$ | 207.63 | 0.0055 | 0.504 | 1.05 | 0.015121 | 1.13 | 0.00569 |
| $Me_3Si$—$SiMeCl_2$ | 187.21 | 0.0003 | 0.027 | 0.05 | 0.000549 | 1.006 | 0.00027 |
| Total | — | 1.09115 | 100 | 131.01 | 2.052238 | — | 1.072 |

The chlorosilane reductions, the disilane cleavage reaction and Si—H/Si—Cl redistribution with about 1 to about 5 wt-% $nBu_4PCl$ were performed in sealed NMR tubes to prevent evaporation of low boiling components, such as $Me_2SiH_2$ and $MeSiH_3$. In case n-$Bu_4PCl$ decomposes running the reactions, n-$Bu_3P$ forms in addition to (poly-) but-1-ene and hydrogen chloride that is responsible for increasing formation of hydrido substituted monosilanes and/or additional chlorination of Si—H bonds (of mono- and disilanes) in to Si—Cl moieties. The products formed upon heating the reaction mixtures and the conversion rates of lithium hydride are given in mol % and are listed in Table 37 for diglyme as solvent.

TABLE 37[1)]

| Diglyme 40 mol % LiH | $Me_2SiCl_2$ | $Me_3SiCl$ | $Me_2SiHCl$ | $MeSiHCl_2$ | $MeSiH_2Cl$ | $Me_2SiH_2$ | $MeSiH_3$ | Conversion of LiH [%] | Remarks |
|---|---|---|---|---|---|---|---|---|---|
| r.t., 12, 6 h | 74.1 | 1.5 | 9.6 | 0.7 | 1.5 | 5.9 | 6.7 | 42 | 0% Decomposition of $nBu_4PCl$ |
| 60° C., 2 h | 52.5 | 1.6 | 27.8 | — | 0.8 | 8.9 | 8.4 | 68 | 1% Decomposition of $nBu_4PCl$ |
| 70° C., 2 h | 41.2 | 1.3 | 40.3 | — | 1.6 | 8.2 | 7.4 | 76 | 2% Decomposition of $nBu_4PCl$ |
| 70° C., 2 h | 37.3 | 1.9 | 44.4 | — | 1.5 | 8.2 | 6.7 | 79 | 2% Decomposition of $nBu_4PCl$ |
| 80° C., 2 h | 34.1 | 1.7 | 48.5 | — | 2.4 | 7.2 | 6.1 | 80 | 3% Decomposition of $nBu_4PCl$ |
| 90° C., 2 h | 32.0 | 1.6 | 52.4 | — | 1.9 | 6.4 | 5.8 | 81 | 3% Decomposition of $nBu_4PCl$ |
| 100° C., 2 h | 30.3 | 1.8 | 53.7 | — | 1.8 | 6.7 | 5.8 | 83 | 3% Decomposition of $nBu_4PCl$ |
| 110° C., 2 h | 25.9 | 1.6 | 54.1 | — | 2.1 | 9.8 | 6.5 | 91 | 5% Decomposition of $nBu_4PCl$ |
| 120° C., 2 h | 25.3 | 1.7 | 55.0 | — | 2.0 | 8.8 | 7.0 | 92 | 5% Decomposition of $nBu_4PCl$ |
| 130° C., 2 h | 25.2 | 1.3 | 54.9 | — | 2.0 | 9.3 | 7.3 | 93 | 5% Decomposition of $nBu_4PCl$ |

TABLE 37[1])-continued

| Diglyme 40 mol % LiH | $Me_2SiCl_2$ | $Me_3SiCl$ | $Me_2SiHCl$ | $MeSiHCl_2$ | $MeSiH_2Cl$ | $Me_2SiH_2$ | $MeSiH_3$ | Conversion of LiH [%] | Remarks |
|---|---|---|---|---|---|---|---|---|---|
| 130° C., 2 h | 24.0 | 1.7 | 54.7 | — | 1.9 | 10.1 | 7.7 | 95 | 5% Decomposition of $nBu_4PCl$ |
| 135° C., 4 h | 23.5 | 1.4 | 54.9 | — | 1.9 | 10.3 | 8.0 | 96 | 5% Decomposition of $nBu_4PCl$ |
| 140° C., 2 h | 21.7 | 1.3 | 54.8 | — | 1.7 | 12.1 | 8.4 | 100 | 5% Decomposition of $nBu_4PCl$ |
| 150° C., 4 h | 21.8 | 1.5 | 54.7 | — | 1.7 | 12.2 | 8.1 | 100 | 5% Decomposition of $nBu_4PCl$ |

[1])NMR scale reaction to prove the conditions for reduction, cleavage and redistribution reactions. For the reaction 40 mol % LiH (in relation to the total chlorine content present in the silane mixture) was used to convert. The concentration of LiH was 17 mol/L related to the solvent. $C_6D_6$ (0.2 mL) was added as NMR standard. $C_6D_6$ is not able to dissolve LiH or LiCl and should not have any affect on the reactions. Reactions were started at room temperature and were controlled increasing temperature form 60° C. in 10° C. steps. $^7$Li-NMR-shifts of LiCl in Diglyme: 0.56 ppm, in 1,4-dioxane: 1.11 ppm and in THF: 0.87 ppm. between 5 to 10 wt.

Table 38 contains data obtained for comparable reactions, but in the presence of 7 mol % of the crown ether 12-crown-4 in the reaction mixture. In the latter case chlorosilane reduction started only at 80° C., at 100° C. the amount of $Me_2SiHCl$ is >40 mol %, while the molar concentration of $Me_2SiH_2$ is very low (3.2 mol %). At temperature above 110° C. the strong formation of solids prevents further NMR investigations on the product mixture.

TABLE 38[1])

| Diglyme + 7 vol % crown | $Me_2SiCl_2$ | $Me_3SiCl$ | $Me_2SiHCl$ | $MeSiHCl_2$ | $MeSiH_2Cl$ | $Me_2SiH_2$ | $MeSiH_3$ | Conversion of LiH [%] | Remarks |
|---|---|---|---|---|---|---|---|---|---|
| r.t., 12, 6 h | 92.9 | 2.8 | — | — | — | — | — | 0 | 0% Decomposition of $nBu_4PCl$ 3.8% $MeSiCl_3$ <1% disilanes |
| 60° C., 2 h | 92.9 | 2.8 | — | — | — | — | — | 0 | 0% Decomposition of $nBu_4PCl$ 3.8% $MeSiCl_3$ <1% disilanes |
| 80° C., 2 h | 84.7 | 1.7 | 0.9 | — | — | 5.1 | 6.8 | 40 | 0% Decomposition of $nBu_4PCl$ 0.9% $MeSiCl_3$ |
| 90° C., 2 h | 74.1 | 1.5 | 16.3 | — | — | 1.5 | 6.7 | 49 | 0% Decomposition of $nBu_4PCl$ |
| 100° C., 2 h | 45.2 | 1.8 | 41.2 | 1.8 | 3.2 | 3.2 | 3.6 | 83 | 1% Decomposition of $nBu_4PCl$ |
| 110° C., 2 h | NMR analysis failed because of too much solids in the NMR tube | | | | | | | — | |
| 120° C., 2 h | NMR analysis failed because of too much solids in the NMR tube | | | | | | | — | |

[1])NMR scale reaction to prove the conditions for reduction, cleavage and redistribution reactions. For the reaction 40 mol % LiH (in relation to the total chlorine content present in the silane mixture) was used to convert. The concentration of LiH was 17 mol/L in relation to the solvent. $C_6D_6$ (0.2 mL) was added as NMR standard. $C_6D_6$ is not able to dissolve LiH or LiCl and should not have any affect on the reactions. Reactions were started at room temperature and were controlled increasing temperature form 60° C. in 10° C. steps. $^7$Li-NMR-shifts of LiCl in Diglyme: 0.56 ppm, in 1,4-dioxane: 1.11 ppm and in THF: 0.87 ppm.

TABLE 39[1])

| 1,4-dioxane | $Me_2SiCl_2$ | $Me_3SiCl$ | $Me_2SiHCl$ | $MeSiHCl_2$ | $MeSiH_2Cl$ | $Me_2SiH_2$ | $MeSiH_3$ | Conversion of LiH [%] | Remarks |
|---|---|---|---|---|---|---|---|---|---|
| r.t., 12, 6 h | 60.6 | 1.8 | 21.8 | — | 0.6 | 7.9 | 7.3 | 63 | 0% Decomposition of $nBu_4PCl$ |
| 60° C., 2 h | 42.0 | 1.3 | 42.8 | — | — | 8.4 | 5.5 | 79 | 0% Decomposition of $nBu_4PCl$ |
| 70° C., 2 h | 34.6 | 1.7 | 49.5 | — | 1.4 | 6.6 | 6.2 | 87 | 1% Decomposition of $nBu_4PCl$ |
| 70° C., 2 h | 32.3 | 1.6 | 53.4 | — | 0.7 | 6.5 | 5.5 | 88 | 2% Decomposition of $nBu_4PCl$ |
| 80° C., 2 h | 31.2 | 1.3 | 54.5 | — | 0.3 | 6.5 | 6.2 | 90 | 2% Decomposition of $nBu_4PCl$ |
| 90° C., 2 h | 29.4 | 1.2 | 55.8 | — | — | 7.1 | 6.5 | 93 | 2% Decomposition of $nBu_4PCl$ |
| 100° C., 2 h | 30.0 | 1.2 | 55.6 | — | — | 6.9 | 6.3 | 92 | 2% Decomposition of $nBu_4PCl$ |
| 110° C., 2 h | 28.9 | 1.4 | 55.4 | — | — | 8.1 | 6.1 | 93 | 2% Decomposition of $nBu_4PCl$ |

TABLE 39[1])-continued

| 1,4-dioxane | Me$_2$SiCl$_2$ | Me$_3$SiCl | Me$_2$SiHCl | MeSiHCl$_2$ | MeSiH$_2$Cl | Me$_2$SiH$_2$ | MeSiH$_3$ | Conversion of LiH [%] | Remarks |
|---|---|---|---|---|---|---|---|---|---|
| 120° C., 2 h | 27.9 | 1.4 | 55.0 | — | — | 8.1 | 7.5 | 97 | 2% Decomposition of nBu$_4$PCl |
| 130° C., 2 h | 28.7 | 1.4 | 55.5 | — | — | 7.2 | 7.2 | 95 | 2% Decomposition of nBu$_4$PCl |
| 130° C., 2 h | 27.7 | 1.7 | 54.3 | — | 1.4 | 8.0 | 6.9 | 97 | 2% Decomposition of nBu$_4$PCl |
| 135° C., 4 h | 27.8 | 1.7 | 55.0 | — | — | 8.0 | 7.5 | 97 | 2% Decomposition of nBu$_4$PCl |
| 140° C., 2 h | 27.9 | 1.4 | 54.5 | — | — | 8.4 | 7.8 | 98 | 2% Decomposition of nBu$_4$PCl |
| 150° C., 4 h | 26.7 | 1.6 | 53.3 | — | 2.1 | 8.3 | 8.0 | 100 | 2% Decomposition of nBu$_4$PCl |

[1])NMR scale reaction to prove the conditions for reduction, cleavage and redistribution reactions. For the reaction 48 mol % LiH (in relation to the total chlorine content present in the silane mixture) was used to convert. The concentration of LiH was 17 mol/L related to the solvent. C$_6$D$_6$ (0.2 mL) was added as NMR standard. C$_6$D$_6$ is not able to dissolve LiH or LiCl and should not have any affect on the reactions. Reactions were started at room temperature and were controlled increasing temperature form 60° C. in 10° C. steps. $^7$Li-NMR-shifts of LiCl in Diglyme: 0.56 ppm, in 1,4-dioxane: 1.11 ppm and in THF: 0.87 ppm.

Table 39 covers the results for comparable reactions but in 1,4-dioxane as solvent, Table 40 shows the results obtained with the addition of 7 mol % of 12-crown-4-ether. In this case the observations made were very similar to those results described for the reaction in diglyme with addition of 12-crown-4-ether (Table 38).

TABLE 40[1])

| Dioxane + 7 vol % crown | Me$_2$SiCl$_2$ | Me$_3$SiCl | Me$_2$SiHCl | MeSiHCl$_2$ | MeSiH$_2$Cl | Me$_2$SiH$_2$ | MeSiH$_3$ | Conversion of LiH [%] | Remarks |
|---|---|---|---|---|---|---|---|---|---|
| r.t., 12, 6 h | 92.9 | 2.8 | — | — | — | — | — | 0 | 0% Decomposition of nBu$_4$PCl 3.8% MeSiCl$_3$ <1% disilanes |
| 60° C., 2 h | 92.9 | 2.8 | — | 0.6 | — | — | — | 1 | 0% Decomposition of nBu$_4$PCl 3.2% MeSiCl$_3$ <1% disilanes |
| 80° C., 2 h | 75.6 | 2.3 | 13.7 | — | 0.8 | 1.5 | 6.0 | 46 | 0% Decomposition of nBu$_4$PCl |
| 90° C., 2 h | 60.6 | 1.8 | 16.4 | — | — | 14.5 | 6.7 | 82 | 0% Decomposition of nBu$_4$PCl |
| 100° C., 2 h | 40.6 | 1.7 | 45.1 | — | 2.0 | 5.3 | 5.3 | 95 | 1% Decomposition of nBu$_4$PCl |
| 110° C., 2 h | 35.5 | 1.4 | 49.2 | — | 1.1 | 7.1 | 5.7 | 111 | 1% Decomposition of nBu$_4$PCl |
| 120° C., 2 h | NMR analysis failed because of too much solids in the NMR tube | | | | | | | — | |

[1])NMR scale reaction to prove the conditions for reduction, cleavage and redistribution reactions. For the reaction 40 mol % LiH (in relation to the total chlorine content present in the silane mixture) was used to convert. The concentration of LiH was 17 mol/L related to the solvent. C$_6$D$_6$ (0.2 mL) was added as NMR standard. C$_6$D$_6$ is not able to dissolve LiH or LiCl and should not have any affect on the reactions. Reactions were started at room temperature and were controlled increasing temperature form 60° C. in 10° C. steps. $^7$Li-NMR-shifts of LiCl in Diglyme: 0.56 ppm, in 1,4-dioxane: 1.11 ppm and in THF: 0.87 ppm.

The reactions performed in THF as solvent are listed in Table 41, those runs in the presence of 12-crown-4-ether in Table 42. Reaction performed in THF generally show high LiH conversion rates and formation of the target compound Me$_2$SiHCl in high yields under moderate reaction conditions.

TABLE 41[1])

| THF | Me$_2$SiCl$_2$ | Me$_3$SiCl | Me$_2$SiHCl | MeSiHCl$_2$ | MeSiH$_2$Cl | Me$_2$SiH$_2$ | MeSiH$_3$ | Conversion of LiH [%] | Remarks |
|---|---|---|---|---|---|---|---|---|---|
| r.t., 12, 6 h | 54.9 | 1.7 | 23.7 | — | — | 11.5 | 8.2 | 61 | 0% Decomposition of nBu$_4$PCl |
| 60° C., 2 h | 30.6 | 1.5 | 48.0 | — | — | 12.3 | 7.6 | 81 | 1% Decomposition of nBu$_4$PCl |
| 70° C., 2 h | 22.4 | 1.3 | 55.1 | — | 1.3 | 11.6 | 7.6 | 88 | 2% Decomposition of nBu$_4$PCl |
| 70° C., 2 h | 21.2 | 1.2 | 57.2 | — | 1.4 | 11.9 | 7.1 | 89 | 2% Decomposition of nBu$_4$PCl |

TABLE 41[1])-continued

| THF | $Me_2SiCl_2$ | $Me_3SiCl$ | $Me_2SiHCl$ | $MeSiHCl_2$ | $MeSiH_2Cl$ | $Me_2SiH_2$ | $MeSiH_3$ | Conversion of LiH [%] | Remarks |
|---|---|---|---|---|---|---|---|---|---|
| 80° C., 2 h | 20.8 | 1.5 | 56.6 | — | 1.6 | 12.0 | 7.5 | 90 | 2% Decomposition of $nBu_4PCl$ |
| 90° C., 2 h | 20.4 | 1.4 | 56.9 | — | 1.2 | 12.4 | 7.7 | 90 | 2% Decomposition of $nBu_4PCl$ |
| 100° C., 2 h | 19.9 | 1.4 | 57.6 | — | 0.8 | 12.9 | 7.4 | 91 | 2% Decomposition of $nBu_4PCl$ |
| 110° C., 2 h | 18.7 | 1.3 | 57.1 | — | 1.1 | 13.9 | 7.9 | 93 | 2% Decomposition of $nBu_4PCl$ |
| 120° C., 2 h | 18.2 | 1.4 | 56.0 | — | 1.1 | 14.6 | 8.7 | 95 | 3% Decomposition of $nBu_4PCl$ |
| 130° C., 2 h | 18.4 | 1.3 | 56.1 | — | 1.1 | 14.8 | 8.3 | 95 | 3% Decomposition of $nBu_4PCl$ |
| 130° C., 2 h | 17.4 | 1.4 | 55.6 | — | 0.7 | 16.5 | 8.5 | 97 | 3% Decomposition of $nBu_4PCl$ |
| 135° C., 4 h | 17.0 | 1.4 | 56.4 | — | — | 16.6 | 8.6 | 97 | 3% Decomposition of $nBu_4PCl$ |
| 140° C., 2 h | 16.7 | 1.5 | 56.2 | — | — | 16.5 | 9.2 | 99 | 3% Decomposition of $nBu_4PCl$ |
| 150° C., 4 h | 16.4 | 1.3 | 54.2 | — | 1.3 | 18.2 | 8.5 | 100 | 3% Decomposition of $nBu_4PCl$ |

[1])NMR scale reaction to prove the conditions for reduction, cleavage and redistribution reactions. For the reaction 59 mol % LiH (in relation to the total chlorine content present in the silane mixture) was used to convert. The concentration of LiH was 17 mol/L (in relation to the solvent). $C_6D_6$ (0.2 mL) was added as NMR standard. $C_6D_6$ is not able to dissolve LiH or LiCl and should not have any affect on the reactions. Reactions were started at room temperature and were controlled increasing temperature form 60° C. in 10° C. steps. $^7$Li-NMR-shifts of LiCl in Diglyme: 0.56 ppm, in 1,4-dioxane: 1.11 ppm and in THF: 0.87 ppm.

TABLE 42[1])

| THF + 7 vol % crown | $Me_2SiCl_2$ | $Me_3SiCl$ | $Me_2SiHCl$ | $MeSiHCl_2$ | $MeSiH_2Cl$ | $Me_2SiH_2$ | $MeSiH_3$ | Conversion of LiH [%] | Remarks |
|---|---|---|---|---|---|---|---|---|---|
| r.t., 12, 6 h | 92.9 | 2.8 | — | — | — | — | — | 0 | 0% Decomposition of $nBu_4PCl$ 3.8% $MeSiCl_3$ <1% disilanes |
| 60° C., 2 h | 92.9 | 2.8 | 0.2 | 1.0 | — | — | — | 2 | 0% Decomposition of $nBu_4PCl$ 2.6% $MeSiCl_3$ <1% disilanes |
| 80° C., 2 h | 75.8 | 1.5 | 4.5 | — | — | 11.4 | 6.8 | 58 | 0% Decomposition of $nBu_4PCl$ |
| 90° C., 2 h | 54.0 | 1.6 | 34.6 | 0.5 | 2.7 | 2.2 | 4.3 | 70 | 1% Decomposition of $nBu_4PCl$ |
| 100° C., 2 h | 45.0 | 1.8 | 41.0 | 1.4 | 3.1 | 3.2 | 4.5 | 83 | 1% Decomposition of $nBu_4PCl$ |
| 110° C., 2 h | 44.0 | 1.8 | 43.6 | 0.4 | 2.7 | 2.7 | 4.8 | 84 | 3% Decomposition of $nBu_4PCl$ |
| 120° C., 2 h | 43.7 | 1.7 | 44.1 | — | 3.1 | 3.1 | 4.4 | 84 | 3% Decomposition of $nBu_4PCl$ |
| 130° C., 2 h | 38.7 | 1.6 | 48.1 | — | 3.0 | 3.9 | 4.7 | 92 | 3% Decomposition of $nBu_4PCl$ |
| 130° C., 2 h | 39.2 | 1.6 | 47.8 | — | 3.1 | 3.1 | 5.1 | 91 | 3% Decomposition of $nBu_4PCl$ |
| 130° C., 2 h | 38.9 | 1.6 | 47.9 | — | 3.1 | 3.5 | 5.1 | 92 | 3% Decomposition of $nBu_4PCl$ |
| 130° C., 2 h | 37.2 | 1.5 | 48.7 | — | 3.0 | 4.1 | 5.6 | 96 | 3% Decomposition of $nBu_4PCl$ |
| 135° C., 4 h | 36.2 | 1.5 | 49.0 | — | 2.9 | 4.3 | 6.0 | 99 | 3% Decomposition of $nBu_4PCl$ |
| 140° C., 2 h | 35.0 | 1.4 | 50.7 | — | 1.7 | 4.9 | 6.3 | 100 | 3% Decomposition of $nBu_4PCl$ |
| 150° C., 4 h | 34.6 | 1.7 | 50.5 | — | 2.8 | 5.2 | 5.2 | 100 | 3% Decomposition of $nBu_4PCl$ |

[1])NMR scale reaction to prove the conditions for reduction, cleavage and redistribution reactions. For the reaction 41 mol % LiH (in relation to the total chlorine content present in the silane mixture) was used to convert. The concentration of LiH was 17 mol/L (in relation to the solvent). $C_6D_6$ (0.2 mL) was added as NMR standard. $C_6D_6$ is not able to dissolve LiH or LiCl and should not have any affect on the reactions. Reactions were started at room temperature and were controlled increasing temperature form 60° C. in 10° C. steps. $^7$Li-NMR-shifts of LiCl in Diglyme: 0.56 ppm, in 1,4-dioxane: 1.11 ppm and in THF: 0.87 ppm

Example 24

Based on the experiments of Example 23 that were performed with about 1 to about 5 wt-% nBu$_4$PCl in sealed NMR tubes in only small amounts of reactants, similar experiments were run in sealed reaction ampules with varying gram-amounts of chlorosilanes, molar composition is given in Table 36. In a detailed study different reaction conditions were investigated that are listed under "Remarks" in the Tables.

Table 43 covers the results obtained for reactions in different glymes as solvent: The reaction temperatures were between 110° C. and 150° C. for 60-65 h. The LiH conversion rates were 60-90 mol %, the lower the LiH concentration (in mol/L) the higher were the conversion rates. Obtained yields for Me$_2$SiHCl were 30-55 mol %, if the amount of Me$_2$SiH$_2$ (<30 mol %) is added, the yield of Me$_2$SiHCl is nearly quantitatively including post processing reactions such as reactions with the ether/HCl reagent (patent pending), or redistribution with Me$_2$SiCl$_2$. Remarkably quite strong decomposition of n-Bu$_4$PCl to give n-Bu$_3$P besides other phosphine compounds and but-1-ene is observed in some cases, the in situ formed HCl acting as chlorination reagent to retransfer Si—H bonds into Si—Cl.

TABLE 43

| Weight of MCS [g] | Exchange of H/Cl [mol %] | LiH—concentration [mol/L] | M2 | M3 | M2H | MH | MH2 | M2H2 | MH3 | Conversion of LiH [%] (±3%) | Remarks |
|---|---|---|---|---|---|---|---|---|---|---|---|
| 13.8 | 51 | 16.9 | 50.5 | 2.0 | 37.0 | 2.0 | 4.0 | 2.0 | 3.0 | 60 | Solvent: Diglyme, 110° C., 65 h<br>4% Decomposition of nBu$_4$PCl<br>Corresponds to 30 mol % LiH |
| 9.8 | 48 | 10.6 | 48.3 | 1.9 | 38.2 | 1.9 | 3.9 | 1.9 | 3.9 | 66 | Solvent: Diglyme, 110° C., 65 h<br>3% Decomposition of nBu$_4$PCl<br>Corresponds to 31 mol % LiH |
| 10.9 | 48 | 10.6 | 46.3 | 1.9 | 40.7 | 1.9 | 3.2 | 2.3 | 3.7 | 67 | Solvent: Triglyme, 110° C., 65 h<br>3% Decomposition of nBu$_4$PCl<br>Corresponds to 31 mol % LiH |
| 9.4 | 48 | 10.6 | 48.3 | 1.9 | 40.1 | 1.0 | 2.9 | 1.9 | 3.9 | 65 | Solvent: Tetraglyme, 110° C., 65 h<br>0% Decomposition of nBu$_4$PCl<br>Corresponds to 31 mol % LiH |
| 5.0 | 81 | 25.7 | 28.5 | 2.0 | 54.70 | — | 1.1 | 9.7 | 4.0 | 56 | Solvent: Diglyme 110° C., 4 h; 130° C., 65 h<br>44% Decomposition of nBu$_4$PCl<br>Corresponds to 44 mol % LiH |
| 4.8 | 81 | 5.0 | 20.0 | 1.8 | 56.4 | — | 1.0 | 16.0 | 4.8 | 65 | Solvent: Diglyme 110° C., 4 h; 130° C., 65 h<br>26% Decomposition of nBu$_4$PCl<br>Corresponds to 52 mol % LiH |
| 4.0 | 81 | 2.0 | 9.3 | 1.3 | 53.1 | — | — | 28.3 | 8.0 | 83 | Solvent: Diglyme 110° C., 4 h; 130° C., 65 h<br>0% Decomposition of nBu$_4$PCl<br>Corresponds to 64 mol % LiH |
| 7.5 | 43 | 10.0 | 59.2 | 1.8 | 30.2 | 2.4 | 3.5 | 1.1 | 1.8 | 57 | Solvent: Diglyme, 130° C., 60 h<br>5% Decomposition of nBu$_4$PCl<br>Corresponds to 24 mol % LiH |
| 5.7 | 65 | 10.0 | 40.5 | 1.6 | 46.6 | 0.8 | 1.6 | 4.9 | 4.0 | 56 | Solvent: Diglyme, 130° C., 60 h<br>30% Decomposition of nBu$_4$PCl<br>Corresponds to 35 mol % LiH |
| 5.3 | 86 | 10.0 | 25.6 | 2.3 | 39.3 | — | 1.0 | 24.4 | 7.4 | 65 | Solvent: Diglyme, 130° C., 60 h<br>30% Decomposition of nBu$_4$PCl<br>Corresponds to 54 mol % LiH |

TABLE 43-continued

| Weight of MCS [g] | Exchange of H/Cl [mol %] | LiH— concentration [mol/L] | M2 | M3 | M2H | MH | MH2 | M2H2 | MH3 | Conversion of LiH [%] (±3%) | Remarks |
|---|---|---|---|---|---|---|---|---|---|---|---|
| 3.8 | 118 | 25.0 | 22.4 | 1.6 | 43.3 | — | 0.2 | 28.9 | 3.6 | 49 | Solvent: Diglyme, 150° C., 60 h<br>100% Decomposition of nBu$_4$PCl<br>Corresponds to 56 mol % LiH |
| 6.1 | 47 | 1.25 | 34.5 | 2.0 | 48.3 | — | 3.8 | 4.8 | 6.4 | 89 | Solvent: Diglyme, 130° C., 62 h<br>0% Decomposition of nBu$_4$PCl<br>Corresponds to 42 mol % LiH |
| 6.8 | 39 | 1.25 | 47.6 | 1.9 | 38.1 | 1.4 | 3.8 | 2.4 | 4.7 | 84 | Solvent: Diglyme, 120° C., 62 h<br>0% Decomposition of nBu$_4$PCl<br>Corresponds to 33 mol % LiH |
| 5.0 | 48 | 1.25 | 35.1 | 1.8 | 47.7 | — | 2.8 | 6.0 | 6.6 | 89 | Solvent: Diglyme, 120° C., 62 h<br>0% Decomposition of nBu$_4$PCl<br>Corresponds to 43 mol % LiH |
| 8.5 | 30 | 1.25 | 56.2 | 1.7 | 31.5 | 2.2 | 3.9 | 1.1 | 3.4 | 88 | Solvent: Diglyme, 120° C., 62 h<br>0% Decomposition of nBu$_4$PCl<br>Corresponds to 27 mol % LiH |
| 4.9 | 51 | 17 | 35.2 | 2.1 | 47.9 | 1.4 | 2.8 | 3.9 | 6.7 | 80 | Solvent: Diglyme 12-crown-4 10vol %, 130° C., 65 h<br>0% Decomposition of nBu$_4$PCl<br>Corresponds to 41 mol % LiH |
| 5.4 | 51 | 17 | 47.2 | 1.9 | 38.7 | 1.9 | 3.8 | 1.9 | 4.7 | 64 | Solvent: Diglyme Addition of KCl, 130° C., 65 h<br>0% Decomposition of nBu$_4$PCl<br>Corresponds to 33 mol % LiH |

M2 = Me$_2$SiCl$_2$,
M3 = Me$_3$SiCl,
M2H = Me$_2$SiHCl,
MH = MeSiHCl$_2$,
MH2 = MeSiH$_2$Cl,
M2H2 = Me$_2$SiH$_2$ and
MH3 = MeSiH$_3$ More efficient are comparable reactions in THF as solvent (Table 44), giving high LiH conversion rates for e.g. with 17 molar LiH-concentrations—eventually in the presence of crown-ether—they reach 100 mol %. In this case the yield of Me$_2$SiHCl is ~56 mol %, Me$_2$SiH$_2$ is formed in ~17 mol %: Including post processing of the dihydridosilanes the overall yield of Me$_2$SiHCl will be about 90 mol %. In the presence of crown-ether a solid residue is formed with LiCl adduct formation that can be split again thermally at ~100° C. into the starting materials and thus will be recycled quantitatively (G. Shore et al., Inorg. Chem. 1999, 38, 4554-4558). In a similar way 1,4-dioxane forms with LiCl a thermo-labile complex that will be split into the adduct forming components at higher temperatures (S. Yamashita et al., Mass Spectroscopy, 11, 106 (1963); 28, 211-216 (1965)). These two findings explain strong solid formation using 1,4-dioxane as solvent, especially in the presence of crown-ethers. That might facilitate product separation because hydridochlorosilanes might be separated from "solid" solvent and/or crown-ether easily with subsequent recycling of the ethers at ~100° C.

TABLE 44

| Weight of MCS [g] | Exchange of H/Cl [mol %] | LiH— concentration [mol/L] | M2 | M3 | M2H | MH | MH2 | M2H2 | MH3 | Conversion of LiH [%] (±3%) | Remarks |
|---|---|---|---|---|---|---|---|---|---|---|---|
| 4.7 | 51 | 17 | 35.5 | 2.0 | 50.8 | 0.7 | 2.0 | 8.8 | 3.2 | 82 | Solvent: THF, 130° C., 65 h<br>36% Decomposition of nBu₄PCl<br>Corresponds to 42 mol % LiH |
| 4.1 | 51 | 17 | 46.3 | 1.9 | 41.6 | 1.9 | 2.3 | 2.3 | 3.7 | 63 | Solvent: DME, 130° C., 65 h<br>26% Decomposition of nBu₄PCl<br>Corresponds to 32 mol % LiH |
| 7.6 | 53 | 17 | 24.9 | 2.1 | 45.6 | 0.0 | 1.0 | 21.6 | 4.81 | 101 | Solvent: THF<br>12-crown-4 5 vol %, 130° C., 65 h<br>10% Decomposition of nBu₄PCl |
|  |  |  | 18.4 | 1.8 | 56.1 | — | 1.1 | 17.1 | 5.5 | 103 | After condensation of all volatile compounds (work up) |
| 8.8 | 51 | 17 | 46.7 | 1.9 | 41.1 | 1.0 | 2.3 | 2.3 | 4.7 | 64 | Solvent: DME<br>12-crown-4 5 vol %, 130° C., 65 h<br>10% Decomposition of nBu₄PCl<br>Corresponds to 33 mol % LiH |
| 12.0 | 51 | 17 | 46.5 | 1.9 | 39.5 | 1.9 | 3.7 | 2.8 | 3.7 | 64 | Solvent: Dioxane, 130° C., 65 h<br>7% Decomposition of nBu₄PCl<br>Corresponds to 33 mol % LiH |
|  |  |  | 48.3 | 1.9 | 40.6 | 1.9 | 3.4 | 1.9 | 2.9 | 60 | After condensation of all volatile compounds (work up) |
| 13.7 | 51 | 17 | 41.7 | 1.7 | 43.3 | 0.8 | 3.3 | 3.8 | 3.4 | 73 | Solvent: Dioxane<br>12-crown-4 2 vol %, 130° C., 65 h<br>6% Decomposition of nBu₄PCl<br>Corresponds to 73 mol % LiH |
| 12.1 | 51 | 10 | 41.2 | 1.6 | 43.6 | 0.8 | 2.9 | 5.8 | 4.1 | 73 | Solvent: THF 130° C., 65 h<br>76% Decomposition of nBu₄PCl<br>Corresponds to 37 mol % LiH |
| 16.8 | 39 | 11 | 55.2 | 1.7 | 33.2 | 2.2 | 3.8 | 1.2 | 2.9 | 69 | Solvent: Dioxane (1:1 in mol dioxane:LiH), 130° C., 64 h<br>5% Decomposition of nBu₄PCl<br>Corresponds to 27 mol % LiH |
| 17.9 | 39 | 14 | 53.9 | 1.7 | 33.6 | 2.2 | 3.2 | 2.2 | 3.2 | 72 | Solvent: Dioxane/THF (1:1), 130° C., 64 h<br>2% Decomposition of nBu₄PCl<br>Corresponds to 28 mol % LiH |

TABLE 44-continued

| Weight of MCS [g] | Exchange of H/Cl [mol %] | LiH—concentration [mol/L] | M2 | M3 | M2H | MH | MH2 | M2H2 | MH3 | Conversion of LiH [%] (±3%) | Remarks |
|---|---|---|---|---|---|---|---|---|---|---|---|
| 12.2 | 39 | 14 | 50.8 | 2.0 | 35.6 | 2.0 | 4.0 | 2.0 | 3.6 | 78 | Solvent: Dioxane/THF (1:1), 12-crown-4 3 vol %, 130° C., 64 h 2% Decomposition of nBu$_4$PCl Corresponds to 28 mol % LiH |
| 4.6 | 51 | 17 | Solvent: DMF, 130° C., 65 h; Reaction with DMF gives 90% of non-identified compounds | | | | | | | | |
| 8.8 | 51 | 17 | Solvent: DMF, 12-crown-4 5 vol %, 130° C., 65 h; Reaction with DMF gives 90% of non-identified compounds | | | | | | | | |

M2 = Me$_2$SiCl$_2$,
M3 = Me$_3$SiCl,
M2H = Me$_2$SiHCl,
MH = MeSiHCl$_2$,
MH2 = MeSiH$_2$Cl,
M2H2 = Me$_2$SiH$_2$ and
MH3 = MeSiH$_3$ As can be seen in Table 44, dimethoxyethane (DME) can be used as solvent too, but shows no significant efforts compared to the other ethers used in our investigations. The same is true for mixtures of ethers as exemplarily shown for reactions performed in 1/1 mixtures of 1,4-dioxane and THF.

The invention claimed is:

1. A process for the manufacture of methylchlorohydridomonosilanes, selected from the group consisting of Me$_2$Si(H)Cl, MeSi(H)Cl$_2$, and MeSi(H)$_2$Cl, comprising:
   subjecting a silane substrate comprising at least one silane selected from the group consisting of:
   (i) monosilanes,
   (ii) disilanes,
   (iii) oligosilanes, and
   (iv) carbodisilanes,
   with the proviso that the at least one silane (i) to (iv) has at least one chloro substituent,
   a) to a hydrogenation reaction with LiH, and
   b) to a redistribution reaction, and
   c) optionally to a cleavage reaction of the Si—Si bonds of the di- or oligosilanes or the Si—C-bond of the carbodisilanes, and
   d) to a separating step of the methylchlorohydridosilanes,
   wherein the process is carried out in the presence of an ether solvent having a boiling point of greater than 70° C., in the absence of AlCl$_3$, and wherein
   (i) the monosilanes are selected from the group consisting of the general formula (I), $$Me_xSiH_yCl_z \quad (I),$$

wherein
   x=1 to 3,
   y=0 to 3,
   z=0 to 3, and
   x+y+z=4,
   (ii) the disilanes are selected from the group consisting of the general empirical formula (II), $$Me_mSi_2H_nCl_o \quad (II)$$

wherein
   m=1 to 6,
   n=0 to 5
   o=0 to 5 and
   m+n+o=6, (iii) oligosilanes are selected from the group consisting of linear or branched oligosilanes of the general empirical formula (III)

$$Me_pSi_qH_rCl_s \quad (III),$$

wherein
   q=3-7
   p=q to (2q+2)
   r, s=0 to (q+2)
   r+s=(2q+2)−p,
   (iv) carbodisilanes are selected from the group consisting of the general formula (IV)

$$(Me_aSiH_bCl_e)—CH_2-(Me_cSiH_dCl_f) \quad (IV)$$

wherein
   a, c are independently of each other 1 to 3,
   b, d are independently from each other 0 to 2,
   e, f are independently from each other 0 to 2,
   a+b+e=3,
   c+d+f=3 and,
   wherein the process further comprises the step of separating the LiCl formed and the step of regeneration of LiH from the separated LiCl, and wherein the process is conducted at a temperature of from about −40° C. to about 250° C. and wherein the hydrogenation reaction a), the redistribution reaction b) and the cleavage reaction c) are carried out simultaneously.

2. A process according to claim 1, wherein the silane substrate is consists of:
   (i) monosilanes,
   (ii) disilanes,
   (iii) oligosilanes, or
   (iv) carbodisilanes.

3. The process of claim 1, wherein
   (i) the monosilanes are selected from the group consisting of formulas:
   MeSiCl$_3$, Me$_2$SiCl$_2$, Me$_3$SiCl, MeSiHCl$_2$, Me$_2$SiHCl, MeSiH$_2$Cl, MeSiH$_3$, Me$_2$SiH$_2$ and Me$_3$SiH,
   (ii) the disilanes are selected from the group consisting of formulas:
   Cl$_2$MeSi—SiMeCl$_2$, Cl$_2$MeSi—SiMe$_2$Cl, Cl$_2$MeSi—SiMe$_3$, ClMe$_2$Si—SiMe$_2$Cl, Me$_3$Si—SiMe$_2$Cl, HMe$_2$Si—SiMe$_2$Cl, H$_2$MeSi—SiMeClH, HClMeSi—SiMeClH, ClHMeSi—SiMeCl$_2$, H$_2$MeSi—SiMeCl$_2$, HMe$_2$Si—SiMeCl$_2$, ClMe$_2$Si—SiMeH$_2$, HMe$_2$Si—

SiMeClH, ClMe₂Si—SiMeClH, Me₃Si—SiMeClH, HMe₂Si—SiMe₂H, H₂MeSi—SiMeH₂, HMe₂Si—SiMeH₂, Me₃Si—SiMeH₂ and Me₃Si—SiMe₂H, (iii) oligosilanes are selected from the group consisting of formulas:

ClMe₂Si—SiMe₂-SiMe₂Cl, ClMe₂Si—SiMe₂-SiMe₂-SiMe₂Cl, (ClMe₂Si)₃SiMe, (Cl₂MeSi)₂SiMeCl, (Cl₂MeSi)₃SiMe, (Cl₂MeSi)₂SiMe-SiClMe-SiCl₂Me, [(Cl₂MeSi)₂SiMe]₂, [(Cl₂MeSi)₂SiMe]₂SiClMe, (Cl₂MeSi)₂SiMe-SiMe₂Cl, ClMe₂Si—SiMe₂SiMe₂H, HMe₂Si—SiMe₂-SiMe₂H, HMe₂Si—SiMe₂-SiMe₂-SiMe₂H, (HMe₂Si)₃SiMe, (H₂MeSi)₂SiMeH, (H₂MeSi)₃SiMe, (H2MeSi)2SiMe-SiHMe-SiH2Me, [(H2MeSi)2SiMe]2, [(H2MeSi)2SiMe]2SiHMe and (H2MeSi)2SiMe-SiMe2H, (iv) the carbodisilanes are selected from the group consisting of formulas:

Cl₂MeSi—CH₂—SiMeCl₂, ClMe₂Si—CH₂—SiMeCl₂, ClMe₂Si—CH₂—SiMe₂Cl, Me₃Si—CH₂—SiMeCl₂, Me₃Si—CH₂—SiMe₂Cl, HClMeSi—CH₂—SiMeClH, HMe₂Si—CH₂—SiMeCl₂, HMe₂Si—CH₂—SiMe₂Cl, Me₃Si—CH₂—SiMeClH, H₂MeSi—CH₂—SiMeH₂, HMe₂Si—CH₂—SiMeH₂, HMe₂Si—CH₂—SiMe₂H, Me₃Si—CH₂—SiMeH₂, and Me₃Si—CH₂—SiMe₂H, with the proviso that at least one of the silanes used in the process has at least one chloro substituent.

4. The process of claim 1, wherein the silane substrate comprises at least one silane selected from the group consisting of MeSiCl₃, Me₂SiCl₂, Me₃SiCl, MeSiHCl₂, Me₂SiHCl, MeSiH₂Cl, MeSiH₃, Me₂SiH₂, Me₃SiH, Cl₂MeSi—SiMeCl₂, Cl₂MeSi—SiMe₂Cl, Cl₂MeSi—SiMe₃, ClMe₂Si—SiMe₂Cl, Me₃Si—SiMe₂Cl, Cl₂MeSi—CH₂—SiMeCl₂, ClMe₂Si—CH₂—SiMeCl₂, ClMe₂Si—CH₂—SiMe₂Cl, Me₃Si—CH₂—SiMeCl₂ and Me₃Si—CH₂—SiMe₂Cl.

5. The process of claim 1, wherein the redistribution reaction of silanes comprises the comproportionation of two different methylsilanes, leading to the formation of one specific chlorohydridomethylsilane.

6. The process of claim 1, wherein the redistribution reaction b) is carried out in the presence of at least one redistribution catalyst.

7. The process of claim 1, wherein the cleavage reaction c) is carried out in the presence of at least one cleavage catalyst.

8. The process of claim 1, wherein the silane substrate comprises a product of the Müller-Rochow Direct Process.

9. The process, of claim 1, wherein the silane substrate comprises the entire product of the Müller-Rochow Direct Process or a part (fraction) of the product of the Müller-Rochow Direct Process.

10. The process of claim 1, wherein the silane substrate comprises the monosilane fraction of the Müller-Rochow Direct Process product.

11. The process, of claim 1, wherein the silane substrate is the higher silane fraction (silanes having ≥2 Si atoms) of the Müller-Rochow Direct Process product.

12. The process of claim 6, wherein the redistribution catalyst is selected from the group consisting of:

R₄PCl, wherein R is hydrogen or an organyl group, which can be the same or different, triorganophosphines, wherein R is hydrogen or an organyl group, triorganoamines, wherein R is an organyl group, N-heterocyclic amines, quaternary ammonium compounds, an alkali metal halide, an alkaline earth metal halide, an alkali metal hydride, and an alkaline earth metal hydride.

13. The process of claim 6, wherein the cleavage catalyst is selected from the group consisting of:

a quaternary Group 15 onium compound R₄QX, wherein each R is independently a hydrogen or an organyl group, Q is phosphorus, arsenic, antimony or bismuth, and X is a halide selected from the group consisting of F, Cl, Br and I, a heterocyclic amine, a heterocyclic ammonium halide, a mixture of R₃P and RX, wherein R is as defined above, and X is as defined above, alkali metal halide, an alkaline earth metal halide, an alkali metal hydride, alkaline earth metal hydride or mixtures thereof, optionally in the presence of hydrogen chloride (HCl).

* * * * *